(12) United States Patent
Hori et al.

(10) Patent No.: US 11,849,350 B2
(45) Date of Patent: Dec. 19, 2023

(54) TERMINAL APPARATUS AND METHOD

(71) Applicant: Sharp Kabushiki Kaisha, Osaka (JP)

(72) Inventors: Takako Hori, Sakai (JP); Hidekazu Tsuboi, Sakai (JP); Shohei Yamada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 73 days.

(21) Appl. No.: 17/632,562

(22) PCT Filed: Aug. 7, 2020

(86) PCT No.: PCT/JP2020/030406
§ 371 (c)(1),
(2) Date: Feb. 3, 2022

(87) PCT Pub. No.: WO2021/029369
PCT Pub. Date: Feb. 18, 2021

(65) Prior Publication Data
US 2022/0279380 A1 Sep. 1, 2022

(30) Foreign Application Priority Data
Aug. 9, 2019 (JP) .................... 2019-147899

(51) Int. Cl.
*H04W 28/06* (2009.01)
*H04W 76/20* (2018.01)
(Continued)

(52) U.S. Cl.
CPC ............ *H04W 28/06* (2013.01); *H04L 69/04* (2013.01); *H04L 69/22* (2013.01); *H04W 76/20* (2018.02); *H04W 76/38* (2018.02)

(58) Field of Classification Search
CPC ........ H04L 69/22; H04L 69/04; H04W 76/20; H04W 28/06; H04W 80/02; H04W 4/70; H04W 76/38
See application file for complete search history.

(56) References Cited

U.S. PATENT DOCUMENTS

2014/0000245 A1* 1/2014 Harada ................ F01N 3/2026
60/286
2018/0063561 A1* 3/2018 Kwon ................ H04N 21/2343
(Continued)

FOREIGN PATENT DOCUMENTS

EP           3905625 A1 * 11/2021 ............. H04L 69/04

OTHER PUBLICATIONS

NTT Docomo, Inc., "New WID on New Radio Access Technology", RP-170855, 3GPP TSG RAN Meeting #75, Mar. 6-9, 2017, 8 pages.
(Continued)

*Primary Examiner* — Syed Ali
(74) *Attorney, Agent, or Firm* — Keating & Bennett, LLP

(57) ABSTRACT

A terminal apparatus for communicating with a base station apparatus, the terminal apparatus including: a receiver configured to receive, from the base station apparatus, an RRC message including an EHC configuration; and a processing unit. The processing unit configures an EHC protocol in accordance with the EHC configuration, and adds a context identifier to data in processing of the EHC protocol, and indicates, in a case that the context identifier is a particular value, that an Ethernet header of the data is uncompressed.

5 Claims, 16 Drawing Sheets

(51) Int. Cl.
*H04W 76/38* (2018.01)
*H04L 69/04* (2022.01)
*H04L 69/22* (2022.01)

(56) References Cited

U.S. PATENT DOCUMENTS

| | | | |
|---|---|---|---|
| 2019/0116521 A1 | 4/2019 | Qiao et al. | |
| 2021/0219173 A1* | 7/2021 | Xu | H04W 72/23 |
| 2021/0219175 A1* | 7/2021 | Xu | H04W 72/23 |
| 2021/0266385 A1* | 8/2021 | Lu | H04L 69/04 |
| 2021/0321292 A1* | 10/2021 | Dudda | H04L 69/04 |
| 2021/0372561 A1* | 12/2021 | Swift | A62B 99/00 |
| 2022/0038560 A1* | 2/2022 | Kim | H04L 69/04 |

OTHER PUBLICATIONS

"3rd Generation Partnership Project; Technical Specification Group Services and System Aspects; System Architecture for the 5G System; Stage 2 (Release 15)", 3GPP TS 23.501 V15.3.0, Sep. 2018, pp. 1-226.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.3.0, Sep. 2018, pp. 1-358.
"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.4.0, Dec. 2018, pp. 1-933.
"3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323 V15.3.0, Mar. 2019, pp. 1-52.
"3rd Generation Partnership Project; Technical Specification Group Radio Access Network; Evolved Universal Terrestrial Radio Access (E-UTRA); Radio Link Control (RLC) protocol specification (Release 15)", 3GPP TS 36.322 V15.3.0, Sep. 2019, pp. 1-47.
"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.3.0, Sep. 2018, pp. 1-127.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V15.3.0, Sep. 2018, pp. 1-59.
"3rd Generation Partnership Project; Technical Specification Group Radio Access Network; NR; NR and NG-RAN Overall Description; Stage 2 (Release 15)", 3GPP TS 38.300 V15.3.0, Sep. 2018, pp. 1-92.

"3rd Generation Partnership Project; Technical Specification Group Radio Access Network; NR; Radio Resource Control (RRC) protocol specification (Release 15)", 3GPP TS 38.331 V15.4.0, Dec. 2018, pp. 1-474.
"3rd Generation Partnership Project; Technical Specification Group Radio Access Network; NR; Packet Data Convergence Protocol (PDCP) specification (Release 15)", 3GPP TS 38.323 V15.3.0, Sep. 2018, pp. 1-26.
"3rd Generation Partnership Project; Technical Specification Group Radio Access Network; NR; Radio Link Control (RLC) protocol specification (Release 15)", 3GPP TS 38.322 V15.3.0, Sep. 2018, pp. 1-33.
"3rd Generation Partnership Project; Technical Specification Group Radio Access Network; NR; Medium Access Control (MAC) protocol specification (Release 15)", 3GPP TS 38.321 V15.3.0, Sep. 2018, pp. 1-76.
"3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.0.0, Jun. 2017, 1-386.
"3rd Generation Partnership Project; Technical Specification Group Services and System Aspects; Procedures for the 5G System; Stage 2 (Release 15)", 3GPP TS 23.502 V15.3.0, Sep. 2018, pp. 1-329.
"3rd Generation Partnership Project; Technical Specification Group Radio Access Network; E-UTRA and NR; Service Data Adaptation Protocol (SDAP) specification (Release 15)", 3GPP TS 37.324 V15.1.0, Sep. 2018, pp. 1-13.
Nokia et al., "New WID: Support of NR Industrial Internet of Things (IoT)", 3GPP TSG RAN Meeting #83, RP-190728, Mar. 18-21, 2019, 6 pages.
ETSI MCC, "Report of 3GPP TSG RAN2#106 meeting", 3GPP TSG-RAN WG2 meeting #107, R2-1908601, May 13-17, 2019, pp. 1-295.
"IEEE 802.1Q-2014—IEEE Standard for Local and metropolitan area networks—Bridges and Bridged Networks", 2014, 22 pages.
Huawei et al., "Context establishment for Ethernet header compression", 3GPP TSG-RAN WG2 Meeting 106, R2-1907333, May 13-17, 2019, 3 pages.
MediaTek Inc., "Details of Ethernet Header Compression", 3GPP TSG-RAN2 Meeting #106, R2-1907074, May 13-17, 2019, 8 pages.
Nokia et al., "Ethernet header compression", 3GPP TSG-RAN WG2 Meeting #106, R2-1907200, May 13-17, 2019, 6 pages.
NTT Docomo, Inc., "Header compression for IIoT", 3GPP TSG-RAN WG2 Meeting #106, R2-1906091, May 13-17, 2019, pp. 1-8.
Sharp, "Handling of new flow when the number of stored contexts are already equal to the MAX_CID", 3GPP TSG-RAN WG2 Meeting #108, R2-1916110, Nov. 18-22, 2019, 2 pages.
Sharp, "PDCP duplication states of the associated RLC entities when duplicationState is absent", 3GPP TSG-RAN WG2#109bis e-meeting, R2-2002862, Apr. 20-30, 2020, pp. 1-7.

* cited by examiner

```
RadioBearerConfig ::=          SEQUENCE {
    <PARTLY OMITTED>
    srb-ToAddModList           SRB-ToAddModList      OPTIONAL,
    drb-ToAddModList           DRB-ToAddModList      OPTIONAL,
    drb-ToReleaseList          DRB-ToReleaseList     OPTIONAL
    <PARTLY OMITTED>
}

SRB-ToAddModList ::=           SEQUENCE (SIZE (1..2)) OF SRB-ToAddMod
SRB-ToAddMod ::=               SEQUENCE {
    srb-Identity               SRB-Identity,
    <PARTLY OMITTED>
    pdcp-Config                PDCP-Config           OPTIONAL,        -- Cond PDCP
    ...
}

DRB-ToAddModList ::=           SEQUENCE (SIZE (1..maxDRB)) OF DRB-ToAddMod
DRB-ToAddMod ::=               SEQUENCE {
    cnAssociation                  CHOICE {
        eps-BearerIdentity             INTEGER (0..15),              -- EPS-DRB-Setup
        sdap-Config                    SDAP-Config                    -- 5GC
    }                              OPTIONAL, -- Cond DRBSetup
    drb-Identity               DRB-Identity,
    <PARTLY OMITTED>
    pdcp-Config                PDCP-Config           OPTIONAL,        -- Cond PDCP
    ...
}

DRB-ToReleaseList ::=          SEQUENCE (SIZE (1..maxDRB)) OF DRB-Identity
DRB-Identity ::=               INTEGER (1..32)
SDAP-Config ::=                SEQUENCE {
    <PARTLY OMITTED>
    pdu-Session                PDU-SessionID,
    mappedQoS-FlowsToAdd       SEQUENCE (SIZE (1..maxNrofQFIs)) OF QFI
    mappedQoS-FlowsToRelease   SEQUENCE (SIZE (1..maxNrofQFIs)) OF QFI
    ...
}
```

FIG. 7

```
<OMITTED>
RadioResourceConfigDedicated  ::=       SEQUENCE {
    <PARTLY OMITTED>
    srb-ToAddModList                        SRB-ToAddModList            ,
    drb-ToAddModList                        DRB-ToAddModList,
    drb-ToReleaseList                       SEQUENCE (SIZE (1..maxDRB)) OF DRB-Identity,
    <PARTLY OMITTED>
}
SRB-ToAddModList ::= SEQUENCE (size (1..2)) OF SRB-ToAddMod
SRB-ToAddMod ::= SEQUENCE {
    <PARTLY OMITTED>
    srb-Identity            INTEGER (1..2),
    pdcp-Config             PDCP-Config                 OPTIONAL,
    <PARTLY OMITTED>
}

DRB-ToAddModList ::= SEQUENCE (size (1..maxDRB)) OF DRB-ToAddMod
DRB-ToAddMod ::= SEQUENCE {
    <PARTLY OMITTED>
    eps-BearerIdentity      INTEGER (0..15)             OPTIONAL,
    drb-Identity            DRB-Identity,
    pdcp-Config             PDCP-Config                 OPTIONAL,
    <PARTLY OMITTED>
}

DRB-Identity ::=            INTEGER (1..32)
<OMITTED>
```

FIG. 8

```
<OMITTED>
PDCP-Config ::=        SEQUENCE {
<PARTLY OMITTED>
[[
    ethernetHeaderCompression-r16 CHOICE {
        notUsed         NULL,
        ehc             SEQUENCE {
            ehc-maxCID          INTEGER (1..127)        DEFAULT 15,
            ehc-profiles        SEQUENCE {
                ehc-profile0x0001   BOOLEAN,
                ehc-profile0x0002   BOOLEAN,
                ehc-profile0x0003   BOOLEAN,
<PARTLY OMITTED>
            }
<PARTLY OMITTED>
        }
<PARTLY OMITTED>
    }                                           OPTIONAL - Cond EtherPDU
<PARTLY OMITTED>
]]
<PARTLY OMITTED>
<OMITTED>
}
```

FIG. 9

```
<OMITTED>
SDAP-Config ::=        SEQUENCE {
    pdu-Session        PDU-SessionID,
    <PARTLY OMITTED>
    mappedQoS-FlowsToAdd      SEQUENCE (SIZE (1..maxNrofQFIs)) OF QFI    OPTIONAL,    -- Need N
    mappedQoS-FlowsToRelease  SEQUENCE (SIZE (1..maxNrofQFIs)) OF QFI    OPTIONAL,    -- Need N
    <PARTLY OMITTED>
    [[  ethernetPduSession-r16    ENUMERATED {true}           OPTIONAL,
    ]],
    <PARTLY OMITTED>
}
<OMITTED>
```

FIG. 10

```
<OMITTED>
PDCP-Config ::=     SEQUENCE {
    <PARTLY OMITTED>
    [[
        ehc-contextToReleaseList-r16 ::=    SEQUENCE (SIZE (1..ehc-maxCID)) OF EHC-CID
        EHC-CID ::=     INTEGER (1..ehc-maxCID)
        <PARTLY OMITTED>
    ]]
    <PARTLY OMITTED>
}
<OMITTED>
```

FIG. 13

```
<OMITTED>
PDCP-Config ::=      SEQUENCE {
  <PARTLY OMITTED>
  [[
    ehcContextDiscardTimer-16    SetupRelease { EhcContextDiscardTimer } OPTIONAL,
  <PARTLY OMITTED>
    EhcContextDiscardTimer ::= ENUMERATED {s1, s2, s3, s5, s7, s10, s15, s20, s40, s50,
s60, s80, s100, s120, s150, s180}
  <PARTLY OMITTED>
  ]]
}
<OMITTED>
```

FIG. 15

TERMINAL APPARATUS AND METHOD

TECHNICAL FIELD

The present invention relates to a terminal apparatus and a method.

This application claims priority based on JP 2019-147899 filed on Aug. 9, 2019, the contents of which are incorporated herein by reference.

BACKGROUND ART

A radio access method and a radio network for cellular mobile communications (which will hereinafter be referred to as "Long Term Evolution (LTE; trade name)" or "Evolved Universal Terrestrial Radio Access (EUTRA)") and a core network (which will be referred to as "Evolved Packet Core (EPC)") have been studied by the 3rd Generation Partnership Project (3GPP). EUTRA is also referred to as E-UTRA.

Furthermore, as a radio access method and a radio network technology for a 5th generation cellular system, technical studies and standardization of LTE-Advanced Pro which is an enhanced technology of LTE and New Radio technology (NR) which is a new radio access technology have been conducted by the 3GPP (NPL 1). Furthermore, 5 Generation Core Network (5GC), which is a core network for the 5th generation cellular system, has also been studied (NPL 2).

Also, as a standard for local area networks, Ethernet (trade name) is standardized by the Institute of Electrical and Electronics Engineers (IEEE) 802 Committee.

CITATION LIST

Non Patent Literature

NPL 1: 3GPP RP-170855, "Work Item on New Radio (NR) Access Technology"
NPL 2: 3GPP TS 23.501 v15.3.0, "System Architecture for the 5G System; Stage 2"
NPL 3: 3GPP TS 36.300 v15.3.0, "Evolved Universal Terrestrial Radio Access (E-UTRA) and Evolved Universal Terrestrial Radio Access Network (E-UTRAN); Overall description; Stage 2"
NPL 4: 3GPP TS 36.331 v15.4.0, "Evolved Universal Terrestrial Radio Access (E-UTRA); Radio Resource Control (RRC); Protocol specifications"
NPL 5: 3GPP TS 36.323 v15.3.0, "Evolved Universal Terrestrial Radio Access (E-UTRA); Packet Data Convergence Protocol (PDCP) specification"
NPL 6: 3GPP TS 36.322 v15.3.0, "Evolved Universal Terrestrial Radio Access (E-UTRA); Radio Link Control (RLC) protocol specification"
NPL 7: 3GPP TS 36.321 v15.3.0, "Evolved Universal Terrestrial Radio Access (E-UTRA); Medium Access Control (MAC) protocol specification"
NPL 8: 3GPP TS 37.340v 15.3.0, "Evolved Universal Terrestrial Radio Access (E-UTRA) and NR; Multi-Connectivity; Stage 2"
NPL 9: 3GPP TS 38.300v 15.3.0, "NR; NR and NG-RAN Overall description; Stage 2"
NPL 10: 3GPP TS 38.331 v15.4.0, "NR; Radio Resource Control (RRC); Protocol specifications"
NPL 11: 3GPP TS 38.323 v15.3.0, "NR; Packet Data Convergence Protocol (PDCP) specification"
NPL 12: 3GPP TS 38.322 v15.3.0, "NR; Radio Link Control (RLC) protocol specification"
NPL 13: 3GPP TS 38.321 v15.3.0, "NR; Medium Access Control (MAC) protocol specification"
NPL 14: 3GPP TS 23.401 v15.0.0, "General Packet Radio Service (GPRS) enhancements for Evolved Universal Terrestrial Radio Access Network (E-UTRAN) access"
NPL 15: 3GPP TS 23.502 v15.3.0, "Procedure for 5G System; Stage 2"
NPL 16: 3GPP TS 37.324 v15.1.0, "NR; Service Data Adaptation Protocol (SDAP) Specification"
NPL 17: 3 GPP RP-190728, "New WID: Support of NR Industrial Internet of Things (IoT)" NPL 18: 3GPP Draft_RAN2_106_Report_v3, "Report of 3GPP TSG RAN WG2 meeting #106" https://www.3gpp.org/ftp/tsg_ran/WG2_RL2/TSGR2_106/Report/Draft_RAN2_106_Report_v3. zip
NPL 19: IEEE 802.1Q-2014—IEEE Standard for Local and metropolitan area networks—Bridges and Bridged Networks.

SUMMARY OF INVENTION

Technical Problem

In the technical studies of NR, a scheme has been examined that expands existing NR technologies to the Industrial Internet of Things (IIoT). (NPL 17). The studies include a study of Ethernet header compression technology, which is a technology for reducing the overhead of an Ethernet header on data on the assumption that an Ethernet frame is transmitted and/or received by using NR.

A direction of Ethernet header compression has been under study in which the Ethernet header compression is implemented by associating Ethernet header information with an identifier referred to as a context identifier and using the context identifier instead of the entire Ethernet header information (NPL 18). However, detailed operations of a terminal for efficiently controlling data transmission and/or reception have not been under study yet.

An aspect of the present invention has been made in light of the foregoing, and an object of the present invention is to provide a terminal apparatus and a method that can efficiently control data transmission and/or reception.

Solution to Problem

In order to accomplish the object described above, an aspect of the present invention is contrived to provide the following measures. Specifically, a terminal apparatus for communicating with a base station apparatus is provided, the terminal apparatus including a receiver configured to receive an RRC message from the base station apparatus, and a processing unit configured to delete a context identifier of a context to be released and the context associated with the context identifier based on inclusion of the context identifier in the RRC message.

An aspect of the present invention provides a terminal apparatus for communicating with a base station apparatus, the terminal apparatus including a receiver configured to receive an RRC message from the base station apparatus, and a processing unit configured to, based on inclusion, in the RRC message, of information for configuring a context management timer, in response to reception of a first service data unit from an upper layer, create a first context related to a header included in the first service data unit and start or restart a first timer for the first context in a case that the first context related to the header included in the first service data unit is not stored, and start or restart the first timer and delete the first context based on expiry of the first timer in a case that the first context related to the header included in the first service data unit is stored.

An aspect of the present invention provides a terminal apparatus for communicating with a base station apparatus, the terminal apparatus including a receiver configured to receive an RRC message from the base station apparatus; and a processing unit configured to, based on inclusion, in the RRC message, of information for configuring a context management timer, in response to reception of a second protocol data unit from a lower layer, create a second context related to a header included in the second protocol data unit and start or restart a second timer for the second context in a case that the second protocol data unit includes information indicating that header compression has not been performed, and start or restart the second timer and delete the second context based on expiry of the second timer in a case that the second protocol data unit includes information indicating that header compression has been performed.

An aspect of the present invention provides a terminal apparatus for communicating with a base station apparatus, the terminal apparatus including a processing unit configured to receive, from the base station apparatus, an RRC message including a maximum value of a context identifier, and in response to receiving a third service data unit from an upper layer, assign a fourth context identifier associated with one of stored contexts to a third context related to a header included in the third service data unit in a case that the third context is not stored and that the number of the stored contexts has reached the maximum value for the context identifiers.

An aspect of the present invention provides a base station apparatus for communicating with a terminal apparatus, the base station apparatus including a transmitter configured to transmit an RRC message to the terminal apparatus, and a processing unit configured to cause the terminal apparatus to delete a context identifier of a context to be released and the context associated with the context identifier, based on inclusion of the context identifier in the RRC message.

An aspect of the present invention provides a base station apparatus for communicating with a terminal apparatus, the base station apparatus including a transmitter configured to transmit an RRC message to the terminal apparatus, and a processing unit configured to cause the terminal apparatus to, based on inclusion, in the RRC message, of information for configuring a context management timer, in response to reception of a first service data unit from an upper layer, create a first context related to a header included in the first service data unit and start or restart a first timer for the first context in a case that the first context related to the header included in the first service data unit is not stored, and start or restart the first timer and delete the first context based on expiry of the first timer in a case that the first context related to the header included in the first service data unit is stored.

An aspect of the present invention provides a base station apparatus for communicating with a terminal apparatus, the base station apparatus including a transmitter configured to transmit an RRC message to the terminal apparatus, and a processing unit configured to cause the terminal apparatus to, based on inclusion, in the RRC message, of information for configuring a context management timer, in response to reception of a second protocol data unit from a lower layer, create a second context related to a header included in the second protocol data unit and start or restart a second timer for the second context in a case that the second protocol data unit includes information indicating that header compression has not been performed, and start or restart the second timer and delete the second context based on expiry of the second timer in a case that the second protocol data unit includes information indicating that header compression has been performed.

An aspect of the present invention provides a base station apparatus for communicating with a terminal apparatus, the base station apparatus including a processing unit configured to transmit an RRC message including a maximum value of a context identifier to the terminal apparatus, and to cause the terminal apparatus to, in response to receiving a third service data unit from an upper layer, assign a fourth context identifier associated with one of stored contexts to a third context related to a header included in the third service data unit in a case that the third context is not stored and that the number of the stored contexts has reached the maximum value for the context identifiers.

An aspect of the present invention provides a method for a terminal apparatus for communicating with a base station apparatus, the method including receiving an RRC message from the base station apparatus, and deleting a context identifier of a context to be released and the context associated with the context identifier based on inclusion of the context identifier in the RRC message.

An aspect of the present invention provides a method for a terminal apparatus for communicating with a base station apparatus, the method including receiving an RRC message from the base station apparatus, and based on inclusion, in the RRC message, of information for configuring a context management timer, in response to reception of a first service data unit from an upper layer, creating a first context related to a header included in the first service data unit and starting or restarting a first timer for the first context in a case that the first context related to the header included in the first service data unit is not stored, and starting or restarting the first timer and deleting the first context based on expiry of the first timer in a case that the first context related to the header included in the first service data unit is stored.

An aspect of the present invention provides a method for a terminal apparatus for communicating with a base station apparatus, the method including receiving an RRC message from the base station apparatus, and based on inclusion, in the RRC message, of information for configuring a context management timer, in response to reception of a second protocol data unit from a lower layer, creating a second context related to a header included in the second protocol data unit and starting or restarting a second timer for the second context in a case that the second protocol data unit includes information indicating that header compression has not been performed, and starting or restarting the second timer and deleting the second context based on expiry of the second timer in a case that the second protocol data unit includes information indicating that header compression has been performed.

An aspect of the present invention provides a method for a terminal apparatus for communicating with a base station apparatus, the method including receiving, from the base station apparatus, an RRC message including a maximum value of a context identifier, and in response to receiving a third service data unit from an upper layer, assigning a fourth context identifier associated with one of stored contexts to a third context related to a header included in the third service data unit in a case that the third context is not stored and that the number of the stored contexts has reached the maximum value for the context identifiers.

An aspect of the present invention provides a method for a base station apparatus for communicating with a terminal apparatus, the method including transmitting an RRC message to the terminal apparatus, and causing the terminal apparatus to delete a context identifier of a context to be released and the context associated with the context identifier, based on inclusion of the context identifier in the RRC message.

An aspect of the present invention provides a method for a base station apparatus for communicating with a terminal apparatus, the method including transmitting an RRC message to the terminal apparatus, and causing the terminal apparatus to, based on inclusion, in the RRC message, of information for configuring a context management timer, in response to reception of a first service data unit from an upper layer, create a first context related to a header included in the first service data unit and start or restart a first timer for the first context in a case that the first context related to the header included in the first service data unit is not stored, and start or restart the first timer and delete the first context based on expiry of the first timer in a case that the first context related to the header included in the first service data unit is stored.

An aspect of the present invention provides a method for a base station apparatus for communicating with a terminal apparatus, the method including transmitting an RRC message to the terminal apparatus, and causing the terminal apparatus to, based on inclusion, in the RRC message, of information for configuring a context management timer, in response to reception of a second protocol data unit from a lower layer, create a second context related to a header included in the second protocol data unit and start or restart a second timer for the second context in a case that the second protocol data unit includes information indicating that header compression has not been performed, and start or restart the second timer and delete the second context based on expiry of the second timer in a case that the second protocol data unit includes information indicating that header compression has been performed.

An aspect of the present invention provides a method for a base station apparatus for communicating with a terminal apparatus, the method including transmitting an RRC message including a maximum value of a context identifier to the terminal apparatus, and causing the terminal apparatus to, in response to receiving a third service data unit from an upper layer, assign a fourth context identifier associated with one of stored contexts to a third context related to a header included in the third service data unit in a case that the third context is not stored and that the number of the stored contexts has reached the maximum value for the context identifiers.

These comprehensive or specific aspects may be implemented in a system, an apparatus, a method, an integrated circuit, a computer program, or a recording medium, or may be implemented in any combination of systems, apparatuses, methods, integrated circuits, computer programs, and recording media.

Advantageous Effects of Invention

According to an aspect of the present invention, the terminal apparatus can implement efficient mobility processing.

BRIEF DESCRIPTION OF DRAWINGS

FIG. 7 illustrates an example of an ASN.1 notation included in a message related to reconfiguration of RRC connection in NR according to an embodiment of the present invention.

FIG. 8 illustrates an example of an ASN.1 notation included in a message related to reconfiguration of RRC connection in E-UTRA according to an embodiment of the present invention.

FIG. 9 illustrates an example of an ASN.1 notation in which an RRC message includes an information element or a field indicating application of Ethernet header compression according to each form of the present implementation.

FIG. 10 illustrates an example of an ASN.1 notation in which an RRC message includes an information element or a field indicating an Ethernet PDU session according to an embodiment of the present invention.

FIG. 13 illustrates an example of an ASN.1 notation of information related to a context to be released or deleted which information is included in an RRC message according to an embodiment of the present invention.

FIG. 15 illustrates an example of an ASN.1 notation in which a PDCP configuration information element includes an information element or a field related to a timer for managing context according to an embodiment of the present invention.

DESCRIPTION OF EMBODIMENTS

Hereinafter, an embodiment of the present invention will be described in detail with reference to the drawings.

LTE (and LTE-A Pro) and NR may be defined as different Radio Access Technologies (RATs). The NR may be defined as a technology included in the LTE. The LTE may be defined as a technology included in the NR. The LTE that is connectible to the NR by using Multi Radio Dual connectivity may be distinguished from the existing LTE. The LTE in which a 5GC is used as a core network may be distinguished from a conventional LTE, where an EPC is used as a core network. The present embodiment may be applied to the NR, the LTE and other RATs. Terms associated with the LTE and the NR are used in the following description. However, the present invention may be applied to other technologies using other terms. In the present embodiment, the term "E-UTRA" may be replaced with "LTE," and the term "LTE" may be replaced with "E-UTRA."

Figure 1:
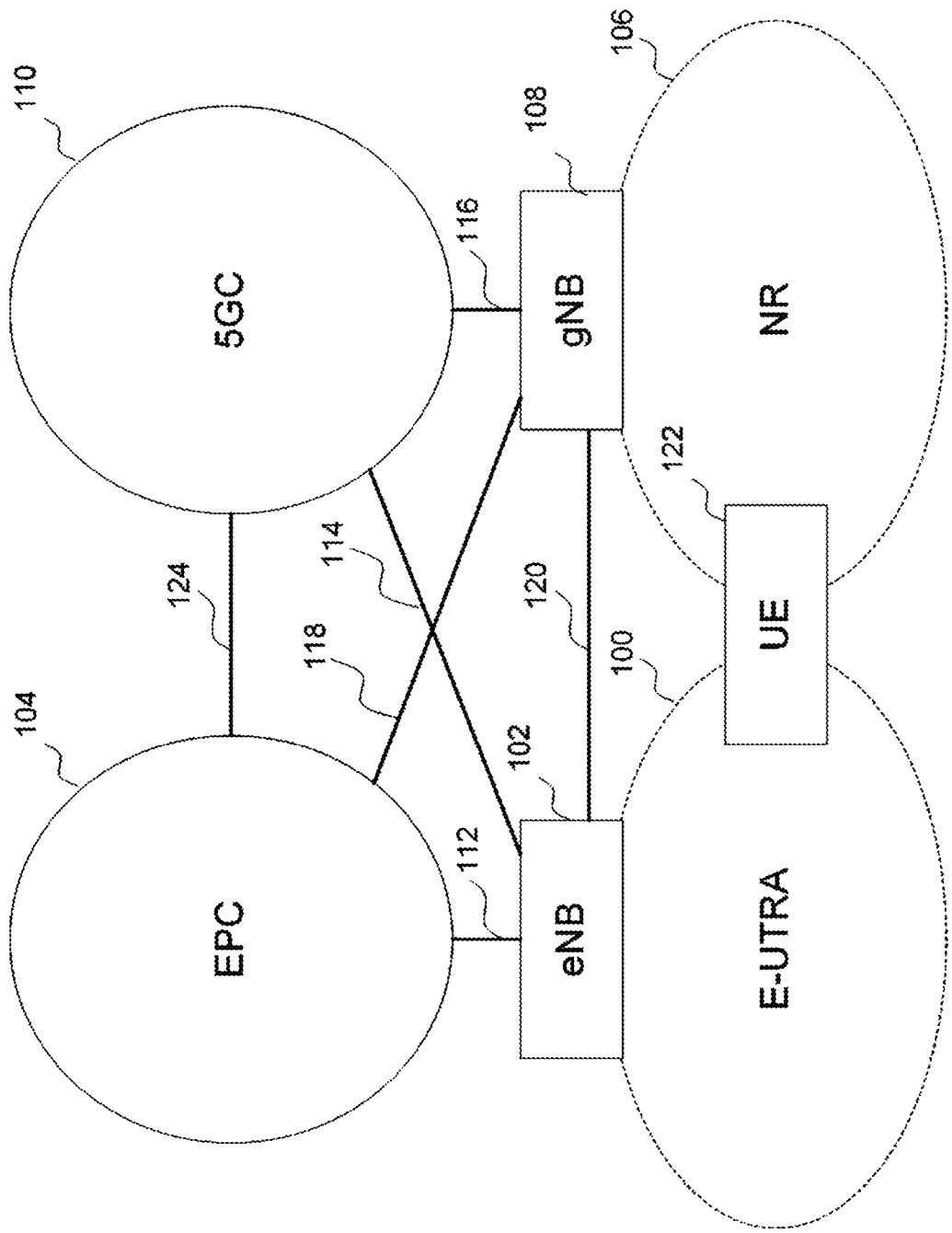
FIG. 1 is a schematic diagram of a communication system according to each embodiment of the present invention.

FIG. 1 is a schematic diagram of a communication system according to each embodiment of the present invention.

An E-UTRA 100 is a radio access technology described in NPL 3 or the like, and includes a cell group (CG) configured in one or multiple frequency bands. An E-UTRAN Node B (eNB) 102 is a base station apparatus of the E-UTRA 100. An Evolved Packet Core (EPC) 104 is a core network described in NPL 14 and the like and is designed as a core network for the E-UTRA 100. An interface 112 is an interface between the eNB 102 and the EPC 104, where there is a control plane (CP) through which control signals are transferred and a user plane (UP) through which user data is transferred.

An NR 106 is a radio access technology described in NPL 9 and the like, and includes a cell group (CG) including one or multiple frequency bands. A gNodeB (gNB) 108 is a base station apparatus in the NR 106. A 5GC 110 is a core network described in NPL 2 and the like, and is designed as a core network for the NR 106, but may also be used as a core network used for the E-UTRA 100 and including a function to connect to the 5GC 110. Hereinafter, the E-UTRA 100 may include the E-UTRA 100 including a function to connect to the 5GC 110.

An interface 114 is an interface between the eNB 102 and the 5GC 110, an interface 116 is an interface between the gNB 108 and the 5GC 110, an interface 118 is an interface between the gNB 108 and the EPC 104, an interface 120 is an interface between the eNB 102 and the gNB 108, and an interface 124 is an interface between the EPC 104 and 5GC 110. The interface 114, the interface 116, the interface 118, the interface 120, the interface 124, and the like may be interfaces that allow a CP only, an UP only, or both the CP and UP to pass through. The interface 114, the interface 116, the interface 118, the interface 120, the interface 124, and the like may be absent depending on a communication system provided by a network operator.

A UE 122 is a terminal apparatus supporting one or all of the E-UTRA 100 and the NR 106. As described in one or all of NPL 3 and NPL 9, in a case that the UE 122 connects to a core network via one or all of the E-UTRA 100 and the NR 106, a logical path called a radio bearer (RB) is established between the UE 122 and one or all of the E-UTRA 100 and the NR 106. The radio bearer used for the CP is referred to as a Signaling Radio Bearer (SRB), and the radio bearer used for the UP is referred to as a Data Radio Bearer (DRB). Each RB is assigned an RB identity (or an RB ID) and uniquely identified. The RB identity for the SRB is referred to as an SRB identity (or an SRB ID), and the RB identity for the DRB is referred to as a DRB identity (or a DRB ID).

As described in NPL 3, in a case that a connection destination core network for the UE 122 is an EPC 104, each DRB established between the UE 122 and any or all of the E-UTRA 100 and the NR 106 is uniquely linked to each Evolved Packet System (EPS) bearer passing through the EPC 104. Each EPS bearer is assigned an EPS bearer identity (or ID), and uniquely identified. Additionally, identical QoS is ensured for data passing through an identical EPS bearer.

As described in NPL 9, in a case that a connection destination core network of the UE 122 is the 5GC 110, one or multiple DRBs established between the UE 122 and one or all of the E-UTRA 100 and the NR 106 are further linked to one of the Packet Data Unit (PDU) sessions established in the 5GC 110. One or multiple QoS flows are present in each PDU session. Each DRB may be mapped to one or multiple QoS flows present in the linked PDU session or to none of the QoS flows. Each PDU session is identified by a PDU session identity (or ID). Additionally, each QoS flow is identified by a QoS flow identity. Identical QoS is ensured for data passing through an identical QoS flow.

In the EPC 104, any of the PDU sessions and the QoS flows is absent or none of the PDU sessions and the QoS flows are present. No EPS bearers are present in the 5GC 110. In other words, in a case of being connected to the EPC 104, the UE 122 has information of the EPS bearers. In a case of being connected to the 5GC 110, the UE 122 has information of any or all of the PDU sessions and the QoS flows.

In the following description, the eNB 102 and/or the gNB 108 is simply referred to as a base station apparatus, and the UE 122 is also simply referred to as a terminal apparatus.

Figure 2:
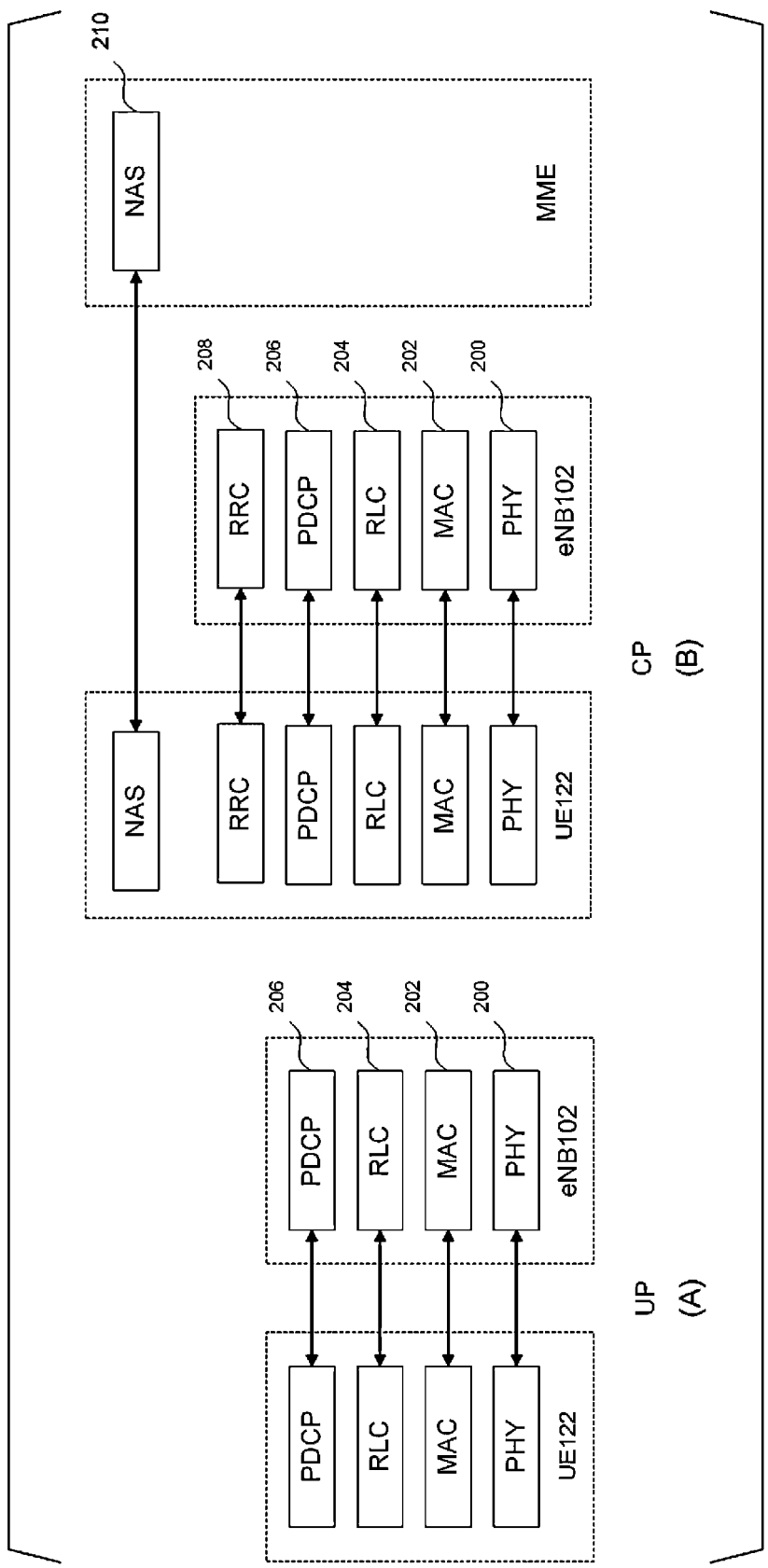
FIG. 2 is a diagram of protocol stacks of UP and CP of a terminal apparatus and a base station apparatus in E-UTRA according to each embodiment of the present invention.

FIG. 2 is a diagram of protocol stacks of UP and CP of a terminal apparatus and a base station apparatus in an E-UTRA radio access layer according to each embodiment of the present invention.

FIG. 2(A) is a diagram of a protocol stack of the UP used in a case that the UE 122 communicates with the eNB 102 in the E-UTRA 100.

A Physical layer (PHY) 200 is a radio physical layer and provides a transmission service to an upper layer by using a physical channel. The PHY 200 is connected with a Medium Access Control layer (MAC) 202 of an upper layer to be described below via transport channels. Data is exchanged between the MAC 202 and the PHY 200 via the transport channels. The data is transmitted and/or received via radio physical channels between the PHYs of the UE 122 and the eNB 102.

The MAC 202 is a medium access control layer that maps various logical channels to various transport channels. The MAC 202 is connected with a radio link control layer (RLC) 204 of an upper layer to be described below via logical channels. The major classifications of the logical channel depend on the type of information to be transmitted, specifically, the logical channels are classified into control channels for transmitting control information and traffic channels for transmitting user information. The MAC 202 has a function of controlling the PHY 200 in order to perform the Discontinuous Reception and Transmission (DRX and DTX), a function of performing a random access procedure, a function of reporting transmit power information, a function of performing HARQ control, and the like (NPL 7).

An RLC 204 is a radio link control layer that segments data received from a Packet Data Convergence Protocol Layer (PDCP) 206 corresponding to an upper layer and described below, and adjusts the data size such that a lower layer can properly transmit the data. Furthermore, the RLC 200 also has a function of ensuring Quality of Service (QoS) required for each piece of data. In other words, the RLC 204 has a function of data retransmission control or the like (NPL 6).

The PDCP 206 is a packet data convergence protocol layer for efficiently transmitting IP packets, used as user data, in wireless sections. The PDCP 206 may include a header compression function to compress unnecessary control information. Additionally, the PDCP 206 may also include a data ciphering function. (NPL 5).

Note that data processed in the MAC 202, the RLC 204, and the PDCP 206 are referred to as a MAC Protocol Data Unit (PDU), an RLC PDU, and a PDCP PDU, respectively. In addition, data delivered from an upper layer to the MAC 202, the RLC 204, and the PDCP 206 or data delivered therefrom to an upper layer are respectively referred to as a MAC Service Data Unit (SDU), an RLC SDU, and a PDCP SDU.

For distinction between PDCP PDUs for data and PDCP PDUs for control, PDCP PDUs may also be referred to as PDCP Data PDUs (PDCP DATA PDUs) and PDCP Control PDUs (PDCP CONTROL PDUs), respectively. For distinction between RLC PDUs for data and RLC PDUs for control, RLC PDUs may also be referred to as RLC Data PDUs (RLC DATA PDUs) and RLC Control PDUs (RLC CONTROL PDUs), respectively.

FIG. 2(B) is a protocol stack diagram of the CP used by the UE 122 in communicating with the eNB 102 and a Mobility Management Entity (MME) used as a logical node providing functions such as authentication and mobility management in the E-UTRA 100.

In the protocol stack of the CP, a Radio Resource Control layer (RRC) 208 and a non Access Strarum (NAS) 210 are present in addition to the PHY 200, the MAC 202, the RLC 204, and the PDCP 206. The RRC 208 is a radio link control layer that performs processing such as establishment, re-establishment, suspension, resumption, and the like of an RRC connection, reconfiguration of the RRC connection, for example, configuration of the radio bearer (RB) and the cell group such as establishment, change, or release, control of logical channels, transport channels, and physical channels, and the like, and further performs configuration of handover and measurement, and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between the RRCs 208 of the eNB 102 and the UE 122. In addition, a portion of the RB including the RLC 204 and the MAC 202 may be referred to as an RLC bearer (NPL 4). In contrast to the NAS layer carrying signals between the MME and the UE 122, some or all of the layers of the PHY 200, the MAC 202, the RLC 204, the PDCP 206, and the RRC 208 carrying signals and data between the UE 122 and the eNB 102 may be referred to as Access Strarum (AS) layers.

The functional classification of the MAC 202, the RLC 204, the PDCP 206, and the RRC 208 described above is an example, and some or all of the respective functions may not be implemented. Some or all of the functions of each layer may be included in another layer.

Note that an IP layer, a Transmission Control Protocol (TCP) layer, a User Datagram Protocol (UDP) layer, an application layer, and the like that are upper layers of the IP layer are upper layers of the PDCP layer (not illustrated). The RRC layer and the non Access Strarum (NAS) layer also correspond to upper layers of the PDCP layer (not illustrated). In other words, the PDCP layer is a lower layer of the Transmission Control Protocol (TCP) layer, the User Datagram Protocol (UDP) layer, and the application layer that are upper layers of the RRC layer, the NAS layer, and the IP layer.

Figure 3:
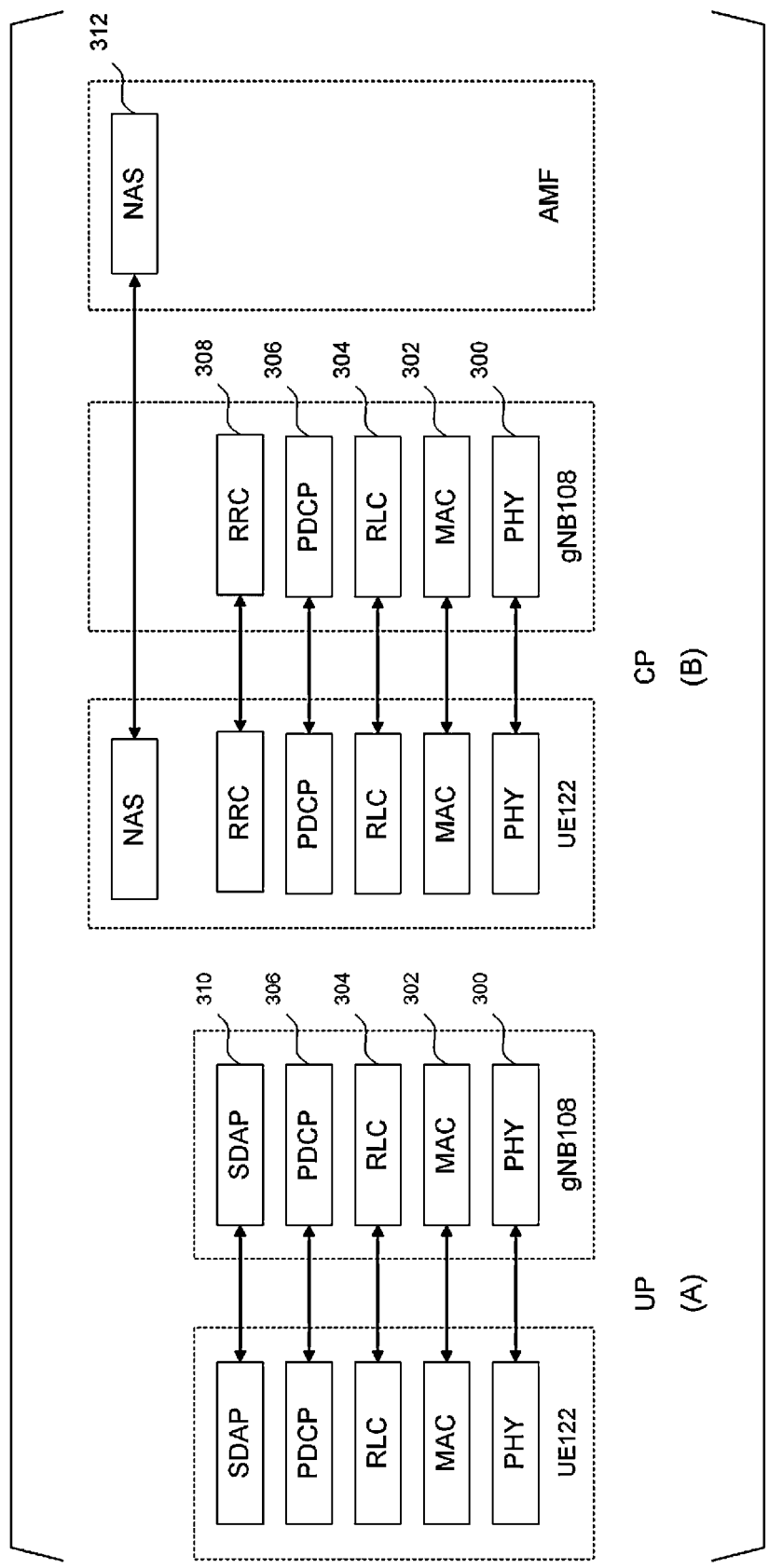
FIG. 3 is a diagram of protocol stacks of the UP and the CP of the terminal apparatus and the base station apparatus in NR according to each embodiment of the present invention.

FIG. 3 is a diagram of protocol stacks of UP and CP of a terminal apparatus and a base station apparatus in an NR radio access layer according to each embodiment of the present invention.

FIG. 3(A) is a diagram of the protocol stack of the UP used by the UE 122 in communicating with the gNB 108 in the NR 106.

A physical layer (PHY) 300 is a radio physical layer of the NR and may provide a transmission service to an upper layer by using a physical channel. The PHY 300 may be connected with the Medium Access Control layer (MAC) 302 of an upper layer to be described below via the transport channels. Data may be exchanged between the MAC 302 and the PHY 300 via the transport channels. The data may be transmitted and/or received between the PHYs of the UE 122 and the gNB 108 via the radio physical channel.

Now, the physical channels will be described.

The following physical channels may be used for the radio communication between the terminal apparatus and the base station apparatus.

Physical Broadcast CHannel (PBCH)
Physical Downlink Control CHannel (PDCCH)
Physical Downlink Shared CHannel (PDSCH)
Physical Uplink Control CHannel (PUCCH)
Physical Uplink Shared CHannel (PUSCH)
Physical Random Access CHannel (PRACH)

The PBCH is used to broadcast system information required by the terminal apparatuses.

The PBCH may be used to broadcast time indexes (SSB-Indexes) within the periodicity of synchronization signal blocks (also referred to as SS/PBCH blocks) in NR.

The PDCCH is used to transmit (or carry) downlink control information (DCI) in a case of downlink radio communication (radio communication from the base station apparatus 3 to the terminal apparatus). Here, one or multiple pieces of DCI (which may be referred to as DCI formats) are defined for transmission of the downlink control information. In other words, a field for the downlink control information is defined as DCI and is mapped to information bits. The PDCCH is transmitted in a PDCCH candidate. The terminal apparatus monitors a set of PDCCH candidates in the serving cell. The monitoring means an attempt to decode the PDCCH in accordance with a certain DCI format. The certain DCI format may be used for scheduling of the PUSCH in the serving cell. The PUSCH may be used for transmission of user data, transmission of RRC messages, and the like.

The PUCCH is used to transmit Uplink Control Information (UCI) in a case of uplink radio communication (radio communication from the terminal apparatus to the base station apparatus). Here, the uplink control information may include Channel State Information (CSI) used to indicate a downlink channel state. The uplink control information may include Scheduling Request (SR) used to request an UL-SCH resource. The uplink control information may include a Hybrid Automatic Repeat request ACKnowledgement (HARQ-ACK).

The PDSCH may be used to transmit downlink data (Downlink Shared CHannel (DL-SCH)) from the MAC layer. Furthermore, in a case of the downlink, the PDSCH is also used to transmit System Information (SI), a Random Access Response (RAR), and the like.

The PUSCH may be used to transmit uplink data (Uplink-Shared CHannel (UL-SCH)) from the MAC layer or to transmit the HARQ-ACK and/or CSI along with the uplink data. Furthermore, the PSCH may be used to transmit the CSI only or the HARQ-ACK and CSI only. In other words, the PSCH may be used to transmit the UCI only. The PDSCH or the PUSCH may be used to transmit RRC signaling (also referred to as RRC messages) and MAC control elements. In this regard, in the PDSCH, the RRC signaling transmitted from the base station apparatus may be signaling common to multiple terminal apparatuses in a cell. The RRC signaling transmitted from the base station apparatus may be dedicated signaling for a certain terminal apparatus (also referred to as dedicated signaling). In other words, terminal apparatus-specific (UE-specific) information may be transmitted through dedicated signaling to the certain terminal apparatus. Additionally, the PUSCH may be used to transmit UE capabilities in the uplink.

The PRACH may be used for transmitting a random access preamble. The PRACH may be used for indicating the initial connection establishment procedure, the handover procedure, the connection re-establishment procedure, synchronization (timing adjustment) for uplink transmission, and a request for a PUSCH (UL-SCH) resource.

The MAC 302 is a medium access control layer that maps various logical channels to various transport channels. The MAC 302 may be connected with a Radio Link Control layer (RLC) 304 of is a high layer to be described below via the logical channels. The classification of the logical channel depends on the type of information to be transmitted, and the logical channels may be classified into the control channels for transmitting the control information and the traffic channels for transmitting the user information. The MAC 302 may have a function of controlling the PHY 300 in order to perform the Discontinuous Reception and Transmission (DRX and DTX), a function of performing the random access procedure, a function of reporting the transmit power information, a function of performing the HARQ control, and the like (NPL 13).

The RLC 304 is a radio link control layer that segments data received from a Packet Data Convergence Protocol Layer (PDCP) 306 described below and corresponding to an upper layer and that adjusts the data size such that a lower layer can properly transmit the data. Furthermore, the RLC 304 may also have a function of ensuring Quality of Service (QoS) required for each piece of data. In other words, the RLC 304 may have a function of data retransmission control or the like (NPL 12).

The PDCP 306 is a packet data convergence protocol layer that efficiently transmits user data in wireless sections. The PDCP 306 may include a header compression function to compress unnecessary control information. Additionally, the PDCP 306 may also include a data ciphering function and a data integrity protection function (NPL 11). Note that the user data described above may or may not be an IP packet or an Ethernet frame described in NPL 19 or the like.

A Service Data Adaptation Protocol (SDAP) 310 is a service data adaptation protocol layer that functions to map the DRB to a downlink QoS flow transmitted from the 5GC 110 to the terminal apparatus via the base station apparatus, and to map the DRB to an uplink QoS flow transmitted from the terminal apparatus to the 5GC 110 via the base station apparatus, and to store mapping rule information (NPL 16).

Note that the data processed in the MAC 302, the RLC 304, the PDCP 306, and the SDAP 310 are referred to as a MAC Protocol Data Unit (PDU), an RLC PDU, a PDCP PDU, and an SDAP PDU, respectively. Data delivered from an upper layer to the MAC 302, the RLC 304, the PDCP 306, and the SDAP 310 or data delivered therefrom to an upper layer are respectively referred to as a MAC Service Data Unit (SDU), an RLC SDU, a PDCP SDU, and an SDAP SDU.

For distinction between SDAP PDUs for data and SDAP PDUs for control, SDAP PDUs may also be referred to as SDAP Data PDUs (SDAP DATA PDUs) and SDAP Control PDUs (SDAP CONTROL PDUs), respectively. For distinction between PDCP PDUs for data and PDCP PDUs for control, PDCP PDUs may also be referred to as PDCP Data PDUs (PDCP DATA PDUs) and PDCP Control PDUs (PDCP CONTROL PDUs), respectively. For distinction between RLC PDUs for data and RLC PDUs for control, RLC PDUs may also be referred to as RLC Data PDUs (RLC DATA PDUs) and RLC Control PDUs (RLC CONTROL PDUs), respectively.

FIG. 3(B) is a protocol stack diagram of the CP used by the UE 122 in communicating with the gNB 108 and an Access and Mobility Management function (AMF) used as a logical node providing functions such as authentication and mobility management in the NR 106.

In the protocol stack of the CP, a Radio Resource Control layer (RRC) 308 and a non Access Strarum (NAS) 312 are present in addition to the PHY 300, the MAC 302, the RLC 304, and the PDCP 306. The RRC 308 is a radio link control layer that performs processing such as establishment, re-establishment, suspension, resumption, and the like of an RRC connection, reconfiguration of the RRC connection, for example, configuration of the radio bearer (RB) and the cell group such as establishment, change, or release, control of logical channels, transport channels, and physical channels, and the like, and further performs configuration of handover and measurement, and the like. The RBs may be classified into a Signaling Radio Bearer (SRB) and a Data Radio Bearer (DRB), and the SRB may be used as a path for transmitting an RRC message which is control information. The DRB may be used as a path for transmitting the user data. Each RB may be configured between RRCs 308 of the gNB 108 and the UE 122. In addition, a portion of the RB including the RLC 304 and the MAC 302 may be referred to as an RLC bearer (NPL 10). In contrast to the NAS layer carrying signals between the AMF and the UE 122, some or all of the layers of the PHY 300, the MAC 302, the RLC 304, the PDCP 306, the RRC 308, and the SDAP 310 carrying signals and data between the UE 122 and the gNB 108 may be referred to as Access Strarum (AS) layers.

For the SRB, SRB0 to SRB3 described below may be defined. SRB0 may be an SRB used for an RRC message and using a Common Control CHannel (CCCH) corresponding to a logical channel SRB1 may be an SRB for the RRC message (which may include a piggybacked NAS message) and for the NAS message prior to the establishment of SRB2, and the Dedicated Control CHannel (DCCH) corresponding to a logical channel may be used for all cases. SRB2 may be an SRB for the NAS message, and the DCCH corresponding to a logical channel may be used for all cases. SRB2 may have a lower priority than SRB1. SRB3 may be an SRB for a particular RRC message in a case that the UE 122 is configured with EN-DC, NGEN-DC, NR-DC, or the like, and the DCCH corresponding to a logical channel may be used for all cases. Other SRBs may also be provided for other applications.

The functional classification of the MAC 302, the RLC 304, the PDCP 306, the SDAP 310, and the RRC 308 described above is an example, and some or all of the functions may not be implemented. Some or all of the functions of each layer may be included in another layer.

Note that an upper layer (not illustrated) of the AS layer may be referred to as a PDU layer, as described in NPL 2. The PDU layer may include any or all of an IP layer, a Transmission Control Protocol (TCP) layer and a User Datagram Protocol (UDP) layer that are upper layers of the IP layer, an Ethernet layer, or other layers. The application layer may be an upper layer of the PDU layer or may be included in the PDU layer. Note that the PDU layer may be an upper layer with respect to the user plane of the AS layer. Additionally, the RRC layer and the non Access Stratum (NAS) layer may be upper layers of one or all of the SDAP layer and the PDCP layer (not illustrated). In other words, one or all of the SDAP layer and the PDCP layer are lower layers of any or all of the RRC layer, the NAS layer, the IP layer, and the Transmission Control Protocol (TCP) layer, the User Datagram Protocol (UDP) layer, the Ethernet layer, and the application layer that are upper layers of the IP layer.

Note that the Ethernet layer described above may or may not be a layer having a function to process the Ethernet frame described in NPL 19 or the like.

Note that, in each embodiment of the present invention, any or all of the following may belong to the application layer: a Session Initiation Protocol (SIP), a Session Description Protocol (SDP), and the like used for IMS; a Real-time Transport Protocol (RTP), a Real-time Transport Control Protocol (RTCP), a Hyper Text Transfer Protocol (HTTP), and the like used for media communication or media communication control; and codecs of various media and the like.

Note that the RRC layer of the terminal apparatus may perform any or all of establishment, configuration, and control on the physical layer, the MAC layer, the RLC layer, the PDCP layer, and the SDAP layer of the terminal apparatus. The RRC layer of the terminal apparatus may establish and/or configure the physical layer, the MAC layer, the RLC layer, the PDCP layer, and the SDAP layer in accordance with the RRC message transmitted from the RRC layer of the base station apparatus. The MAC layer, the RLC layer, the PDCP layer, and the SDAP layer may respectively be referred to as a MAC sublayer, an RLC sublayer, a PDCP sublayer, and a SDAP sublayer.

Note that an entity may refer to each of the layers belonging to the AS layer configured for one or all of the terminal apparatus and the base station apparatus or the function of each layer. Specifically, the physical layer (PHY layer), the MAC layer, the RLC layer, the PDCP layer, the SDAP layer, and the RRC layer, on which any or all of establishment, configuration, and control is performed for one or all of the terminal apparatus and the base station apparatus, or the functions of the respective layers may be referred to as a physical entity (PHY entity), a MAC entity, an RLC entity, a PDCP entity, an SDAP entity, and an RRC entity. One or multiple entities may be included in each layer. Any or all of establishment, configuration, and control may be performed on the PDCP entity and the RLC entity for each radio bearer. Any or all of establishment, configuration, and control may be performed on the MAC entity for each cell group. Any or all of establishment, configuration, and control may be performed on the SDAP entity for each PDU session.

Note that a COUNT value may be used in a case that processing for ciphering or integrity protection is performed in the PDCP layer or the PDCP entity. The COUNT value may include a Hyper Frame Number (HFN) and a Sequence Number (SN) added to the header of the PDCP PDU. The sequence number may be incremented by one each time a PDCP DATA PDU is generated by the PDCP layer or PDCP entity on the transmission side. The HFN may be incremented by one each time the sequence number reaches the maximum value.

Note that in each embodiment of the present invention, for a distinction between the E-UTRA protocol and the NR protocol, the MAC 202, the RLC 204, the PDCP 206, and the RRC 208 may be respectively referred to as a MAC for E-UTRA or a MAC for LTE, an RLC for E-UTRA or an RLC for LTE, a PDCP for E-UTRA or a PDCP for LTE, and an RRC for E-UTRA or an RRC for LTE. Furthermore, the MAC 302, the RLC 304, the PDCP 306, and the RRC 308 may also be referred to as MAC for NR, RLC for NR, RLC for NR, and RRC for NR, respectively. Alternatively, there may be descriptions using a space such as an E-UTRA PDCP or an LTE PDCP, an NR PDCP, and the like.

As also illustrated in FIG. 1, the eNB 102, the gNB 108, the EPC 104, and the 5GC 110 may be connected to one another via the interface 112, the interface 116, the interface 118, the interface 120, and the interface 114. Thus, the RRC 208 in FIG. 2 may be replaced with the RRC 308 in FIG. 3 to support various communication systems. Furthermore, the PDCP 206 in FIG. 2 may also be replaced with the PDCP 306 in FIG. 3. Furthermore, the RRC 308 in FIG. 3 may include the function of the RRC 208 in FIG. 2. Furthermore, the PDCP 306 in FIG. 3 may be the PDCP 206 in FIG. 2. In the E-UTRA 100, the NR PDCP may be used as a PDCP even in a case that the UE 122 communicates with the eNB 102.

The state transition of the UE 122 in LTE and NR will now be described. The UE 122 connected to the EPC may be in an RRC_CONNECTED state in a case that an RRC connection has been established. The UE 122 may be in an RRC_INACTIVE state in a case that the RRC connection is suspended (in a case that the UE 122 is connected to the 5GC). In the other cases, the UE 122 may be in an RRC_IDLE state.

Note that the UE 122 connected to the EPC does not have the RRC_INACTIVE state but that the E-UTRAN may initiate suspension of the RRC connection. In this case, in response to suspension of the RRC connection, the UE 122 transitions to the RRC_IDLE state while retaining an AS context of the UE and an identity used for resumption (resumeIdentity). In a case that the UE 122 retains the AS context of the UE and that the E-UTRAN permits the RRC connection to be resumed and that the UE 122 needs to transition from the RRC_IDLE state to the RRC_CONNECTED state, the resumption of the RRC connection suspended may be initiated by the upper layer (e.g., the NAS layer).

In other words, the definition of the suspension may vary between the UE 122 connected to the EPC and the UE 122 connected to the 5GC. All or part of the procedure for resuming the connection suspended may vary between a case where the UE 122 is connected to the EPC (the connection is suspended in the RRC_IDLE state) and a case where the UE 122 is connected to the 5GC (the connection is suspended in the RRC_INACTIVE state).

Note that the RRC_CONNECTED state, the RRC_INACTIVE state, and the RRC_IDLE state may be respectively referred to as a connected mode, an inactive mode, and an idle mode.

The AS context of the UE retained by the UE 122 may be information including all or some of a current RRC configuration, a current security context, a PDCP state including a RObust Header Compression (ROHC) state, a Cell Radio Network Temporary Identifier (C-RNTI) used in a PCell of a connection source, a cell identity (cellIdentity), and a physical cell identity of the PCell of the connection source. Note that the AS context of the UE retained by one or all of the eNB 102 and the gNB 108 may include information identical to the information of the AS context of the UE retained by the UE 122, or may include information different from the information included in the AS context of the UE retained by the UE 122.

The security context may be information including all or some of a ciphering key at the AS level, a Next Hop parameter (NH), a Next Hop Chaining Counter parameter (NCC) used to derive an access key for the next hop, an identifier of a ciphering algorithm at a selected AS level, and a counter used for replay protection.

Figure 4:
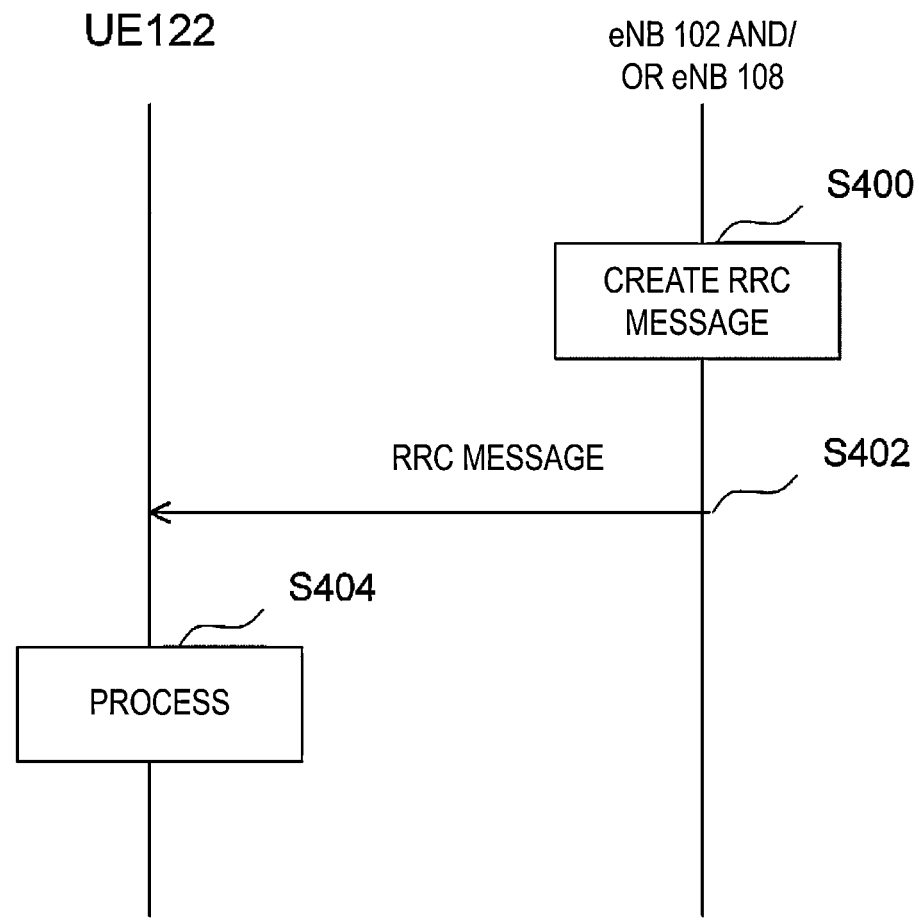
FIG. 4 is a diagram illustrating an example of a flow of a procedure for various configurations in an RRC 208 and/or an RRC 308 according to each embodiment of the present invention.

FIG. 4 is a diagram illustrating an example of a flow of a procedure for various configurations in the RRC 208 and/or the RRC 308 according to each embodiment of the present invention. FIG. 4 is an example of a flow in a case that an RRC message is sent from the base station apparatus (eNB 102 and/or gNB 108) to the terminal apparatus (UE 122).

In FIG. 4, the base station apparatus creates an RRC message (step S400). The creation of the RRC message in the base station apparatus may be performed in a case that the base station apparatus distributes broadcast information (System Information (SI)) or paging information, or in a case that the base station apparatus determines a need to cause a particular terminal apparatus to perform processing, for example, configuration related to security, reconfiguration of an RRC connection (processing (establishment, change, release, or the like) of the radio line bearer, processing (establishment, addition, change, release, or the like) of the cell group, measurement configuration, handover configuration, or the like), release of the RRC connected state, or the like. Additionally, the RRC message may be used for a command for handover to a different RAT. The RRC message includes information (parameters) for various information notifications and configurations. In specifications related to RRC in NPL 4, NPL 10, or the like, the above-described parameters are referred to as fields and/or information elements, and are notated by using a notation method referred to as Abstract Syntax Notation One (ASN.1).

In FIG. 4, the base station apparatus then transmits the RRC message created, to the terminal apparatus (step S402). Then, in a case that processing such as a configuration is necessary in accordance with the RRC message received, the terminal apparatus performs the processing (step S404).

Note that the creation of the RRC message is not limited to the example described above, and may be performed for other purposes, as described in NPL 4, NPL 10, and the like.

For example, the RRC message may be used for configuration related to Dual Connectivity (DC) or Multi-Radio Dual Connectivity (MR-DC) described in NPL 8.

The Dual Connectivity (DC) may be a technology for performing data communication by using radio resources of both cell groups including a master cell group (MCG) including master nodes (MNs) and a secondary cell group (SCG) including secondary nodes (SNs), each cell group including two base station apparatuses (nodes). The master node and the secondary node may be an identical node (identical base station apparatus). Furthermore, the MR-DC described in NPL 8 may be a technology in which cells of both Radio Access Technologies (RATs) of E-UTRA and NR are formed into cell groups for each RAT, which are assigned to the UE, and in which data communication is performed by utilizing radio resources of both MCG and SCG. In the MR-DC, the master node may be a base station including primary RRC functions related to MR-DC, for example, functions to add a secondary node, to establish, change, and release an RB, to add, change, and release an MCG, and to perform handover and the like, and the secondary base station may be a base station including some RRC functions, for example, functions to change and release an SCG, and the like.

In the MR-DC described in NPL 8, the RRC corresponding to the master node side RAT may be used to configure both the MCG and the SCG. For example, in E-UTRA-NR Dual Connectivity (EN-DC) corresponding to the MR-DC in which the EPC 104 is used as a core network and the eNB 102 (also referred to as an evolved eNB 102) is used as a master node and in NG-RAN E-UTRA-NR Dual Connectivity (NGEN-DC) corresponding to the MR-DC in which the 5GC 110 is used as a core network and the eNB 102 is used as a master node, an RRC message for E-UTRA described in NPL 4 may be transmitted and received between the eNB 102 and the UE 122. In this case, the RRC message may include NR configuration information described in NPL 10 as well as LTE (E-UTRA) configuration information. Additionally, the RRC message transmitted from the eNB 102 to the UE 122 may be transmitted from the eNB 102 to the UE 122 via the gNB 108. The configuration of the present RRC message may be used in E-UTRA/5GC (option 5 described in NPL 17) corresponding to non-MR-DC in which the eNB 102 (evolved eNB) uses the 5GC as a core network.

Additionally, in contrast, in the MR-DC described in NPL 8, in NR-E-UTRA Dual Connectivity (NE-DC) corresponding to the MR-DC in which the 5GC 110 is used as a core network and the gNB 108 is used as a master node, an RRC message for NR described in NPL 10 may be transmitted and received between the gNB 108 and the UE 122. In this case, the RRC message may include LTE (E-UTRA) configuration information described in NPL 4 as well as NR configuration information. Additionally, the RRC message transmitted from the gNB 108 to the UE 122 may be transmitted from the gNB 108 to the UE 122 via the eNB 102.

Note that the embodiment is not limited to the case of utilization of the MR-DC and that the RRC message for E-UTRA transmitted from the eNB 102 to the UE 122 may include an RRC message for NR, whereas or the RRC message for NR transmitted from the gNB 108 to the UE 122 may include an RRC message for E-UTRA.

A network configuration in which the eNB 102 is used as a master node and the EPC 104 is used as a core network may be referred to as E-UTRA/EPC. Additionally, a network configuration in which the eNB 102 is used as a master node and the 5GC 110 is used as a core network may be referred to as E-UTRA/5GC. In addition, a network configuration in which the gNB 108 is used as a master node and the 5GC 110 is used as a core network may be referred to as NR or NR/5GC. Moreover, this designation need not be limited to a case where the DC is configured. in the case that the DC is not configured, the above-described master node may refer to a base station apparatus that communicates with the terminal apparatus.

Figure 5:
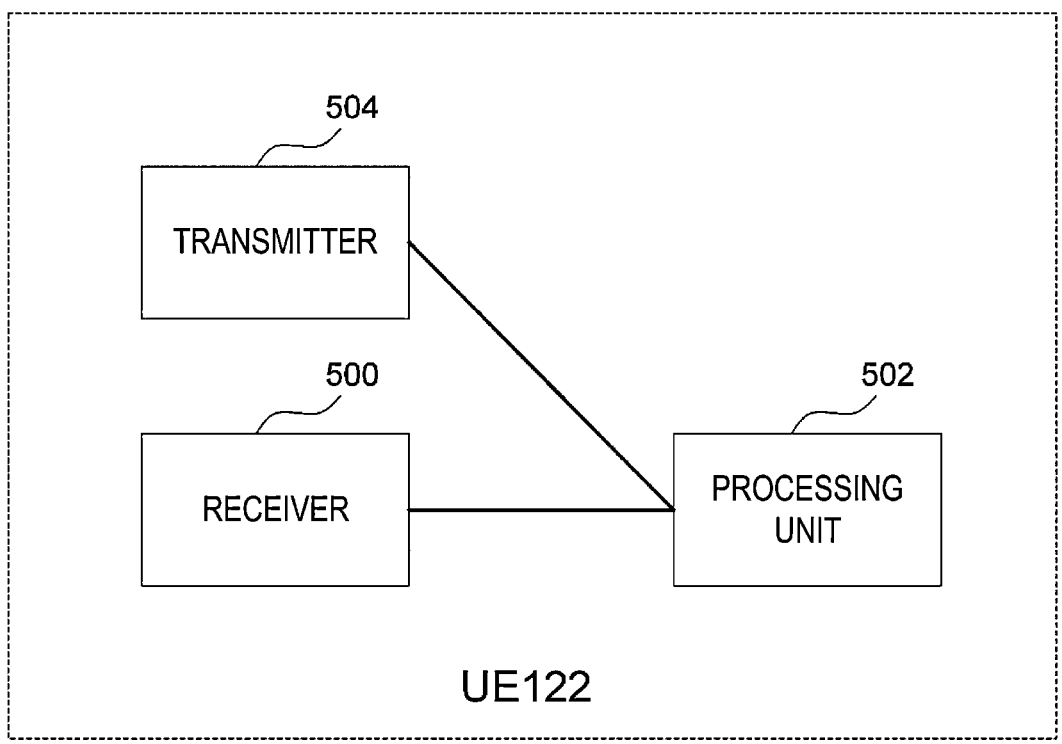
FIG. 5 is a block diagram illustrating a configuration of a terminal apparatus according to each embodiment of the present invention.

The UE 122 illustrated in FIG. 5 includes a receiver 500 configured to receive an RRC message and the like from a base station apparatus, a processing unit 502 configured to perform processing in accordance with any or all of pieces of configuration information such as various information elements (IEs), various fields, and various conditions included in the message received, and a transmitter 504 configured to transmit the RRC message and the like to the base station apparatus. The above-described base station apparatus may be the eNB 102 or the gNB 108. The processing unit 502 may include some or all of the functions of various layers (e.g., the physical layer, the MAC layer, the RLC layer, the PDCP layer, the SDAP layer, the RRC layer, and the NAS layer). In other words, the processing unit 502 may include some or all of a physical layer processing unit, a MAC layer processing unit, an RLC layer processing unit, a PDCP layer processing unit, an RRC layer processing unit, and an NAS layer processing unit.

Figure 6:
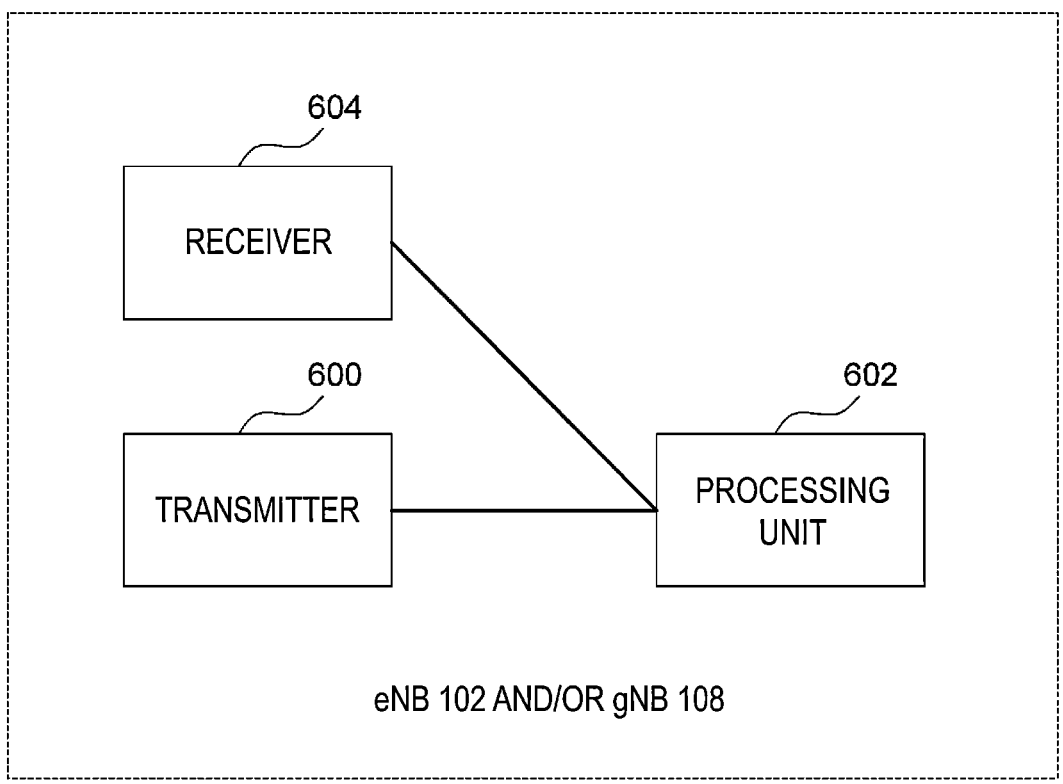
FIG. 6 is a block diagram illustrating a configuration of a base station apparatus according to each embodiment of the present invention.

FIG. 6 is a block diagram illustrating a configuration of the base station apparatus according to each embodiment of the present invention. Note that FIG. 6 illustrates only the main components closely related to one aspect of the present invention in order to avoid complexity of description. The above-described base station apparatus may be the eNB 102 or the gNB 108.

The base station apparatus illustrated in FIG. 6 includes a transmitter 600 configured to transmit an RRC message and the like to the UE 122, a processing unit 602 configured to create an RRC message including any or all of pieces of configuration information such as various information elements (IEs), various fields, and various conditions and to transmit the RRC message to the UE 122 to cause the processing unit 502 of the UE 122 to perform processing, and a receiver 604 configured to receive the RRC message and the like from the UE 122. Furthermore, the processing unit 602 may include some or all of the functions of various layers (e.g., the physical layer, the MAC layer, the RLC layer, the PDCP layer, the RRC layer, and the NAS layer). In other words, the processing unit 602 may include some or all of the physical layer processing unit, the MAC layer processing unit, the RLC layer processing unit, the PDCP layer processing unit, the SDAP processing unit, the RRC layer processing unit, and the NAS layer processing unit.

FIG. 7 illustrates an example of an ASN.1 notation representing one or all of a field and an information element related to a radio bearer configuration included in a message related to reconfiguration of RRC connection in NR in FIG. 4. FIG. 8 illustrates an example of an ASN.1 notation representing one or all of a field and an information element related to a radio bearer configuration included in a message related to reconfiguration of RRC connection in E-UTRA in FIG. 4. In examples of ASN.1, not only in FIGS. 7 and 8, according to an embodiment of the present invention, <omitted> and <partly omitted> are not part of the ASN.1 notation but other information is omitted. Note that there may also be omitted information elements in a part where neither <omitted> nor <partly omitted> is indicated. Note that the examples of ASN.1 according to an embodiment of the present invention do not correctly follow the ASN.1 notation but represent examples of parameters in a message related to reconfiguration of RRC connection according to an embodiment of the present invention and that any other designation and any other notation may be used. The examples of ASN.1 according to an embodiment of the present invention correspond to only examples related to main information closely associated with an aspect of the present invention in order to avoid complicated description. Note that, in an embodiment of the present invention, the parameters notated in ASN.1 may all be referred to as information elements without distinction between fields, information elements, or the like. In an embodiment of the present invention, the parameters such as fields and information elements notated in ASN.1, the parameters being included in the RRC message, may also be referred to as information. Note that the message related to reconfiguration of RRC connection may be an RRC reconfiguration message in NR or an RRC connection reconfiguration message in E-UTRA.

In FIG. 7, the information element represented by Radio-BearerConfig is an information element related to configurations of radio bearers such as SRBs or DRBs and include PDCP configuration information elements and SDAP configuration information elements to be described later. An information element represented by SRB-ToAddMod and included in the information elements represented by Radio-BearerConfig may be information indicating a signaling radio bearer (SRB) configuration, and may also be referred to as an SRB configuration information element or a signaling radio bearer configuration information element. An information element represented by SRB-ToAddModList may be a list of pieces of information indicating SRB configurations. An information element represented by DRB-ToAddMod and included in the information elements represented by RadioBearerConfig may be information indicating a data radio bearer (DRB) configuration, and may also be referred to as a DRB configuration information element or a data radio bearer configuration information element. An information element represented by DRB-ToAddModList may be a list of pieces of information indicating DRB configurations. Note that any or all of the SRB configurations and the DRB configurations may be referred to as radio bearer configurations.

An information element included in the SRB configuration information elements and represented by SRB-Identity is information of SRB identity of an SRB to be added or changed, and may be an identifier that uniquely identifies the SRB at each terminal apparatus. This information element may be replaced with an SRB identity information element, a radio bearer identity information element, or a signaling radio bearer identity information element.

An information element included in the DRB configuration information elements and represented by DRB-Identity is an information of DRB identity of a DRB to be added or changed, and may be an identifier that uniquely identifies the DRB at each terminal apparatus. This information element may be replaced with a DRB identity information element, a radio bearer identity information element, or a data radio bearer identity information element. In the example illustrated in FIG. 7, the DRB identity has an integer value ranging from 1 to 32. However, the DRB identity may take another value. For DC, the DRB identity is unique within the scope of the UE 122.

An information element included in the DRB configuration information elements and represented by cnAssociation may be an information element indicating whether the EPC 104 or the 5GC 110 is used as a core network, and may also be referred to as a core network association information element. In other words, in a case that the UE 122 is connected to the EPC, the DRB may be associated with an EPS bearer identity information element (eps-BearerIdentity) in cnAssociation or with an EPS bearer identity corresponding to the value of the EPS bearer identity information element. In a case that the UE 122 is connected to the 5GC 110, the DRB may be associated with an SDAP entity configured in accordance with an SDAP configuration information element (sdap-Config) described below, or a PDU session information element described below and included in the SDAP configuration information element, or a PDU session identity corresponding to the value of the PDU session information element, or a PDU session indicated by the PDU session information element. In other words, the information represented by cnAssociation may include an EPS bearer identity information element (eps-BearerIdentity) in a case that the EPC 104 is used as a core network, such as in a case of using EN-DC, and may include an information element (sdap-Config) indicating an SDAP configuration in a case that the 5GC 110 is used as a core network, in other words, in a case of not using EN-DC.

The information element represented by sdap-Config may be information related to a configuration or reconfiguration of the SDAP entity that determines a mapping method between the QoS flow and the DRB in a case that the 5GC 110 is used as a core network, and may be replaced with an SDAP configuration information element.

A field or an information element included in the SDAP configuration information elements and represented by pdu-session or PDU-SessionID may be the PDU session identity of a PDU session described in NPL 2 and to which the QoS flow mapped to the radio bearer corresponding to the value of the radio bearer identity information element belongs, the radio bearer identity information element being included in the DRB configuration information elements including the present SDAP configuration information element, and may be replaced with a PDU session identity information element. The value of the PDU session identity information element may be an integer that is not negative. Additionally, at each of the terminal apparatuses, multiple DRB identities may correspond to one PDU session identity.

An information element included in the SDAP configuration information elements and indicated by mappedQoS-FlowsToAdd may be information indicating a list of QoS flow identity (QFI) information elements described below of QoS flows to be mapped to or additionally mapped to the radio bearer corresponding to the value of the radio bearer identity information element included in the DRB configuration information elements including the present SDAP configuration information elements, and may be replaced with an added QoS flow information element. The QoS flow described above may be a QoS flow of a PDU session indicated by the PDU session information element included in the present SDAP configuration information elements.

An information element included in the SDAP configuration information elements and indicated by mappedQoS-FlowsToRelease may be information indicating a list of QoS flow identity (QFI) information elements described below of QoS flows from which a mapping relationship is to be released and which are included in the QoS flows mapped to the radio bearer corresponding to the value of the radio bearer identity information element included in the DRB configuration information elements including the present SDAP configuration information elements, and may be replaced with a released QoS flow information element. The QoS flow described above may be a QoS flow of a PDU session indicated by the PDU session information element included in the present SDAP configuration information elements.

An information element indicated by QFI may be a QoS flow identity described in NPL 2 and uniquely identifying a QoS flow, and may be replaced with a QoS flow identity information element. The value of the QoS flow identity information element may be an integer that is not negative. The value of the QoS flow identity information element may be unique to the PDU session.

Furthermore, the SDAP configuration information elements may include, in addition to the above-described information elements, an uplink header information element indicating whether an uplink SDAP header is present in uplink data transmitted via the configured DRB, a downlink header information element indicating whether a downlink SDAP header is present in downlink data received via the configured DRB, a default bearer information element indicating whether the configured DRB is a default radio bearer (default DRB), and the like.

Information elements included in the SRB configuration information elements and the DRB configuration information elements and represented by pdcp-Config or PDCP-Config may be information elements used to establish or change the PDCP 306 for the SRB and/or the DRB and related to the configuration of an NR PDCP entity, and may be replaced with PDCP configuration information elements. The information elements related to the configuration of the NR PDCP entity include an information element indicating the size of an uplink sequence number, an information element indicating the size of a downlink sequence number, an information element indicating a profile of header compression (RObust Header Compression (RoHC)), a re-ordering timer information element, and the like.

An information element represented by DRB-ToReleaseList and included in the information elements represented by RadioBearerConfig may include information indicating one or more DRB identities to be released.

In FIG. 8, an information element represented by radioResourceConfigDedicated may be an information element used for configuration, change, release, or the like of the radio bearer. An information element represented by SRB-ToAddMod and included in the information elements represented by RadioResourceConfigDedicated may be information indicating a signaling radio bearer (SRB) configuration, and may be replaced with an SRB configuration information element or a signaling radio bearer configuration information element. An information element represented by SRB-ToAddModList may be a list of piece of information indicating SRB configurations. An information element represented by DRB-ToAddMod and included in the information elements represented by RadioResourceConfigDedicated may be information indicating a data radio bearer (DRB) configuration, and may be replaced with a DRB configuration information element or a data radio bearer configuration information element. An information element represented by DRB-ToAddModList may be a list of pieces of information indicating DRB configurations. Note that any or all of the SRB configurations and the DRB configurations may be referred to as radio bearer configurations.

An information element included in the SRB configuration information elements and represented by SRB-Identity is information of SRB identity of an SRB to be added or changed, and may be an identifier that uniquely identifies the SRB at each terminal apparatus. This information element may be replaced with an SRB identity information element, a radio bearer identity information element, or a signaling radio bearer identity information element. An information element represented by SRB-Identity in FIG. 8 may be an information element having a role identical to the role of the information element represented by SRB-Identity in FIG. 7.

An information element included in the DRB configurations and represented by DRB-Identity may be information of DRB identity of a DRB to be added or changed and may be a DRB identity uniquely identifying, at each terminal apparatus, the DRB. This information element may be replaced with a DRB identity information element, a radio bearer identity information element, or a data radio bearer identity information element. In the example illustrated in FIG. 8, the DRB Identity has an integer value ranging from 1 to 32. However, the DRB identity may take another value. The information element represented by DRB-Identity in FIG. 8 may be an information element having a role identical to the role of the information element represented by DRB-Identity in FIG. 7.

An information element included in the DRB configuration information elements and represented by eps-BearerIdentity may be an EPS bearer identity uniquely identifying an EPS bearer at each terminal apparatus. The information element represented by eps-BearerIdentity may be referred to as an EPS bearer identity information element. In the example illustrated in FIG. 8, the EPS bearer Identity has an integer value ranging from 1 to 15. However, the EPS bearer identity may take another value. The information element represented by eps-BearerIdentity in FIG. 8 may be an information element having a role identical to the role of the information element represented by eps-BearerIdentity in FIG. 7. At each terminal apparatus, the EPS bearer identities may correspond to the DRB identities on a one-to-one basis.

An information element included in the SRB configuration information elements and the DRB configuration information elements and represented by pdcp-Config or PDCP-Config may be an information element related to the configuration of an E-UTRA PDCP entity and used to establish or change the PDCP 206 for the SRB and/or for the DRB, and may be replaced with a PDCP configuration information element. The information elements related to the configuration of the E-UTRA PDCP entity may include an information element indicating the size of the sequence number, an information element indicating the profile of header compression (RObust Header Compression (RoHC)), re-ordering timer information, and the like.

Additionally, some or all of the information elements illustrated in FIG. 7 or FIG. 8 may be optional. In other words, the information elements illustrated in FIG. 7 or FIG. 8 may be included in a message related to the reconfiguration of RRC connection depending on requirements or conditions. In addition, the message related to the reconfiguration of RRC connection may include an information element meaning that a full configuration is to be applied, in addition to an information element related to the configuration of the radio bearer. The information element meaning that the full configuration is to be applied may be represented by an information element name such as fullConfig, and true, enable, or the like may be used to indicate application of the full configuration.

An information element represented by DRB-ToReleaseList and included in the information elements represented by RadioResourceConfigDedicated may include information indicating one or more DRB identities to be released.

Now, an example of a processing method of an Ethernet header compression protocol according to an embodiment of the present invention will be described with reference to FIGS. 9 to 11. Note that the Ethernet header compression protocol described above may be referred to as Ethernet header compression processing. The Ethernet header compression processing may be performed based on the inclusion, in the RRC message transmitted to the UE 122 from the base station apparatus, of an information element or a field indicating application of Ethernet header compression and/or an information element or a field indicating an Ethernet PDU session. In the present example, an example has been described in which the Ethernet header compression is performed in the PDCP entity. However, the Ethernet header compression may be performed by an entity in another layer. The base station apparatus may be the eNB 102 or the gNB 108, but the description below uses the gNB 108 to avoid complicated description. In an embodiment of the present invention, the Ethernet header may be part or all of the communication control information included in the Ethernet frame. In an embodiment of the present invention, the Ethernet frame may be an IEEE 802.1 Medium Access Control (MAC) frame format, which is described in IEEE documents such as NPL 19.

FIG. 9 illustrates an example of an ASN.1 notation in which the RRC message transmitted from the gNB 108 to the UE 122 includes an information element or a field indicating application of the Ethernet header compression. FIG. 10 illustrates an example of an ASN.1 notation in which the RRC message transmitted from the gNB 108 to the UE 122 includes an information element or a field indicating an Ethernet PDU session. Note that as in the case of FIGS. 7 and 8, in the examples of ASN.1, <omitted> and <partly omitted> are not part of the ASN.1 notation but indicate that other information is omitted. Note that there may also be omitted information elements in a part where neither <omitted> nor <partly omitted> is indicated. Note that the examples of ASN.1 do not correctly follow the ASN.1 notation but represent examples of parameters in the RRC message according to an embodiment of the present invention and that any other designation and any other notation may be used. The examples of ASN.1 correspond to only examples related to main information closely associated with an aspect of the present invention in order to avoid complicated description. Note that the parameters notated in ASN.1 may all be referred to as information elements without distinction between fields, information elements, or the like. In an embodiment of the present invention, the parameters such as fields and information elements notated in ASN.1, the parameters being included in the RRC message, may also be referred to as information.

FIG. 9 illustrates an example in which the PDCP configuration information element in FIG. 7 and/or FIG. 8 includes an information element or a field indicating application of the Ethernet header compression. In FIG. 9, the field or information element indicated by the designation ethernetHeaderCompression-r16 and included in the PDCP configuration information element is a field or information element for configuration for the Ethernet header compression protocol. Hereinafter, the field or information element for configuration related to the Ethernet header compression protocol may be referred to as an Ethernet Header Compression (EHC) configuration. The Ethernet header compression configuration may be present only in a case that the PDCP entity for the DRB associated with the Ethernet PDU session is established, and otherwise need not be present. The field or information element included in the Ethernet header compression configuration and indicated by the designation notUsed may be a field or an information element indicating that the Ethernet header compression is not applied or that the Ethernet header compression is not configured. The field or information element included in the Ethernet header compression configuration and indicated by the designation ehc may be information indicating that the Ethernet header compression is applied or that the Ethernet header compression is configured, or may include information required to apply the Ethernet header compression. The above-described information required to apply the Ethernet header compression may, for example, be the maximum value for the context identity or context identifier (CID). The maximum value for the context identifier described above may be the maximum value of a non-negative integer or a positive integer that can be used as a context identifier, or may be the upper limit of the number of integers that can be used as context identifiers. In the example in FIG. 9, the field indicated by the designation ehc-maxCID indicates the maximum value for the context identifiers described above. In the notation example in FIG. 9, the maximum value for the context identifiers may take an integer from 1 to 127, and the default value is specified as 15, but these values need not necessarily be used. The maximum value for the context identifiers being '0' or '1' may mean that the Ethernet header compression is not applied. The configuration may be such that the total of the maximum values of the context identifiers in all DRBs for the PDU session should not exceed the maximum number of context identifiers per PDU session or per UE, which number has been sent to the gNB by the UE 122 as UE capability. Note that the context identifier may be an identifier for uniquely identifying the information required to compress and/or decompress the Ethernet header. Also, the above-described information required to compress and/or decompress the Ethernet header may be part or all of the Ethernet header information. The above-described part or all of the Ethernet header information may be information to be compressed by the Ethernet header compression which information is included in the Ethernet header information. The above-described information required to compress and/or decompress the Ethernet header may be referred to as a context. The information may be an Ethernet header compression profile. The information element or field indicated by the designation ehc-profiles in FIG. 9 may be the above-described information element indicating the Ethernet header compression profile. The Ethernet header compression profile described above may indicate an Ethernet header compression method. The Ethernet header compression method described above may be a method specifying which field of the header is to be compressed. The relationship between the Ethernet header compression profile described above and the Ethernet header compression method described above may be a relationship such that, for example, in a case that three fields A, B, and C are present in the Ethernet header, profile 1 indicates that only A is compressed, profile 2 indicates that only A and B are compressed, and profile 3 indicates that A, B, and C are compressed. The information element or field indicating profile 1 described above may be indicated by an information element or a field indicated by the designation ehc-profile0x0001 in FIG. 9. The information elements or fields indicating the profile 2 described above may also be indicated by information elements or fields indicated by the designation ehc-profile0x0002 in FIG. 9. The information elements or fields indicating the profile 3 described above may also be indicated by information elements or fields indicated by the designation ehc-profile0x0003 in FIG. 9. The above-described Ethernet header compression profile may indicate the type of an Ethernet frame format. The type of the Ethernet frame format may include, for example, Ethernet2, an Ethernet2+802.1Q tag, an Ethernet2+802.1Q tag+802.1Q tag, and the like, which are described in IEEE documents such as NPL 19. The Ethernet header compression profile described above may be information indicating a combination of some or all of the Ethernet header compression method described above, the type of the Ethernet frame format described above, and other information. The UE 122 may configure the Ethernet header compression based on the inclusion, in the RRC message received from the gNB 108, of information indicating that the Ethernet header compression described above is performed or that the Ethernet header compression is configured. The information required to apply the Ethernet header compression described above may be context identifier information available (not illustrated). The context identifier information available may be provided as a range such as "from 10 to 20", or specified as values such as "5, 10, 15, and 20."

Note that some or all of the fields and information elements in FIG. 9 may be separately configured for transmission (uplink) and/or for reception (downlink). In other words, different information elements or fields may be used for uplink and downlink.

FIG. 10 illustrates an example in which the SDAP configuration information element in FIG. 7 includes an information element or a field indicating an Ethernet PDU session. In FIG. 10, the field or information element indicated by the designation ethernetPduSession-r16 may be a field or an information element indicating that a PDU session associated with an SDAP entity established and/or configured by the present SDAP configuration information element is an Ethernet PDU session or whether the PDU session is an Ethernet PDU session. In a case that the field or information element indicated by the designation ethernetPduSession-r16 is true, this may indicate an Ethernet PDU session. The field or information element for configuration related to the Ethernet header compression protocol in FIG. 9 may be present exclusively in a case that the field or information element includes information indicating an Ethernet PDU session in FIG. 10. Note that, in a case that the RRC message received from the gNB 108 includes the above-described information element or field indicating an Ethernet PDU session, the SDAP entity of the UE 122 may consider the upper layer as the Ethernet layer, or may deliver, to the Ethernet layer, an SDAP SDU into which an SDAP PDU received from the lower layer is processed.

Figure 11:
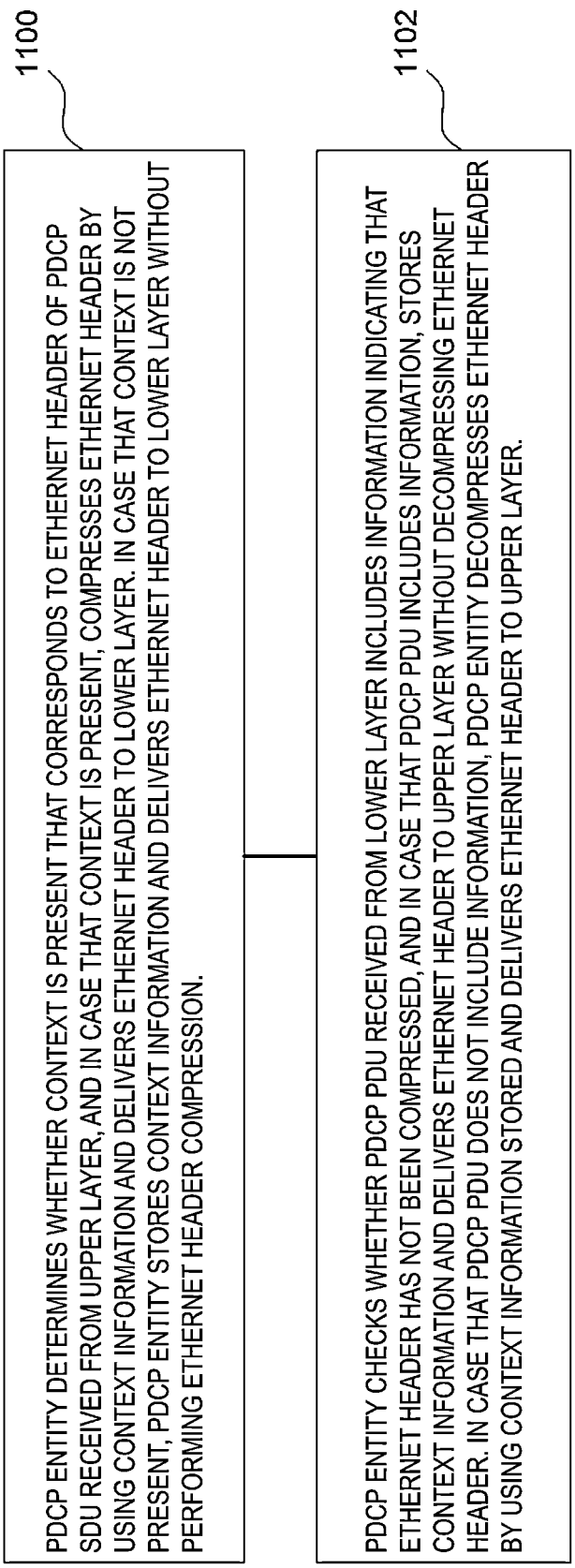
FIG. 11 illustrates an example of a processing method of an Ethernet header compression protocol according to an embodiment of the present invention.

FIG. 11 illustrates an example of the processing method of the Ethernet header compression protocol according to an embodiment of the present invention. The PDCP entity of the UE 122 checks the Ethernet header of the PDCP SDU received from the upper layer, and in a case that the Ethernet header information to be compressed is not stored along with a context identifier as a context, the PDCP entity stores, as a context, the above-described Ethernet header information to be compressed, and associates the Ethernet header information with the context identifier. The context identifier and context may be associated with each other on a one-to-one basis. The context identifier described above may be included in the context described above. Next, the PDCP entity of the UE 122 may add, to the PDCP SDU described above, any or all of the associated context identifier, information indicating that the Ethernet header has not been compressed or changed, and other information, and submit the PDCP SDU to the lower layer. The PDCP entity of the UE 122 may check the Ethernet header of the PDCP SDU received from the upper layer, and in a case that the same information as the Ethernet header information to be compressed is retained together with a context identifier as a context, and/or a feedback indicating that the Ethernet header compression is allowed (or indicating that the context is correctly stored) has been received from the corresponding PDCP entity of the gNB 108, delete, from the PDCP SDU described above, the Ethernet header information to be compressed, add, to the PDCP SDU, any or all of the associated context identifier, information indicating that the Ethernet header has been compressed or changed, and other information, and submit the PDCP SDU to the lower layer (step S1100).

In a case that the PDCP PDU received from the lower layer explicitly or implicitly includes information indicating that the Ethernet header has not been compressed or changed, the PDCP entity of the UE 122 may use, as a context, the Ethernet header information to be compressed which information is included in the Ethernet header included in the PDCP PDU described above, and store the Ethernet header information in association with the context identifier included in the PDCP PDU described above. In response to the storage, a feedback indicating that the Ethernet header compression is allowed (or indicating that the context is correctly stored) may be transmitted to the corresponding PDCP entity of the gNB 108. In a case that the PDCP PDU received from the lower layer explicitly or implicitly includes information indicating that the Ethernet header has not been compressed or changed, the PDCP entity of the UE 122 may deliver the PDCP SDU to the upper layer without decompressing the Ethernet header. In a case that the PDCP PDU received from the lower layer implicitly or explicitly includes information indicating that the Ethernet header has been compressed or changed, the PDCP entity of the UE 122 may decompress the Ethernet header and deliver the PDCP SDU to the upper layer in accordance with the stored context information (step S1102).

Note that the above-described Ethernet header information to be compressed may be the total Ethernet header information or part of Ethernet header information. The Ethernet header compression protocol described above is an example, and the procedure described above need not necessarily be used. Steps S1100 and S1102 have no ordinal relationship and may be performed as independent steps.

A first example of a processing method of the UE 122 according to an embodiment of the present invention will be described by using FIG. 12. The processing method of the UE 122 according to an embodiment of the present invention, illustrated in FIG. 12, generally corresponds to processing in which the UE 122 releases or deletes the stored context based on the information of the context to be released or deleted, the information being transmitted from the gNB 108. For example, in a case that a QoS flow corresponding to the DRB is released, the gNB 108 may send, to the UE 122, the information of the context to be released or deleted to cause the release, from the UE 122, of a context corresponding to an Ethernet flow linked to the QoS flow released. For example, in a case that no transmission and/or reception of an Ethernet frame corresponding to the context stored in the UE 112 occurs for a certain amount of time, the gNB 108 may send, to the UE 122, information of the context to be released or deleted to cause the release of the context from the UE 122. Note that the processing of the UE 122 according to an embodiment of the present invention illustrated in FIG. 12 may be performed in a case that the Ethernet header compression is configured. Note that the Ethernet flow described above may refer to an Ethernet frame in which some or all of a source MAC address and a destination MAC address, and other Ethernet header information are the same.

Figure 12:
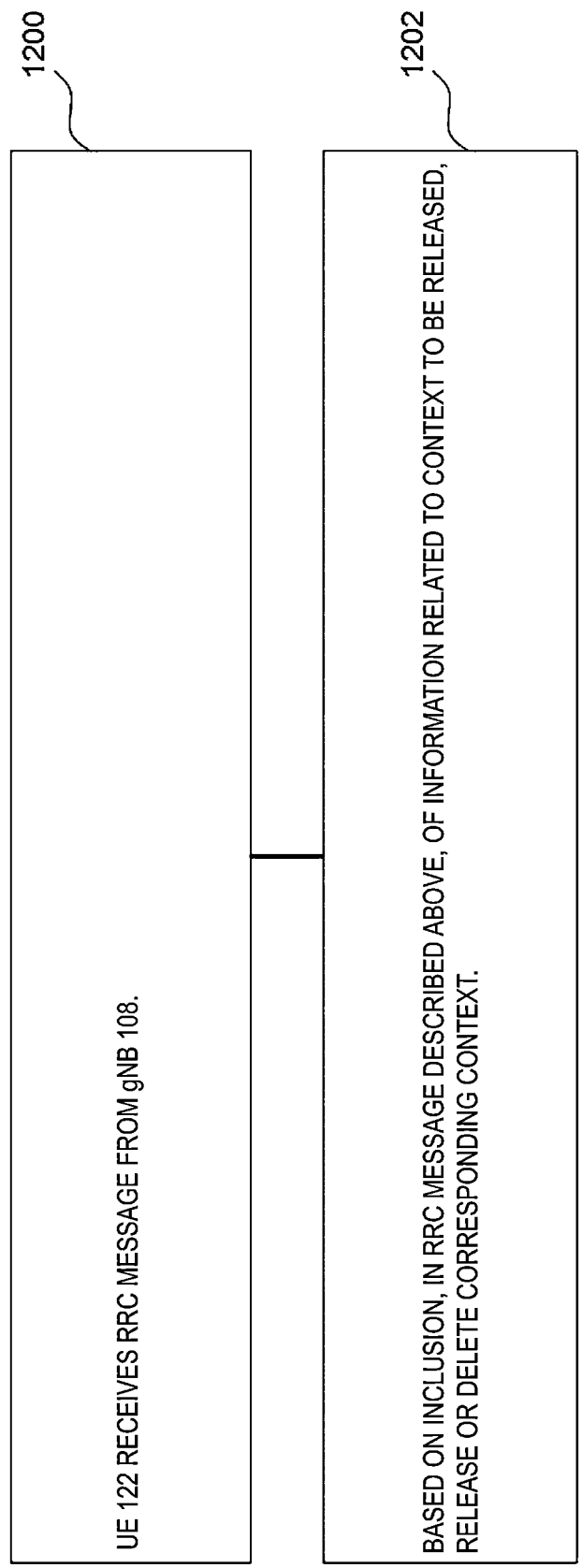
FIG. 12 illustrates a first example of a processing method of a UE 122 according to an embodiment of the present invention.

In FIG. 12, the processing unit 602 of the gNB 108 creates an RRC message for causing the UE 122 to perform processing and transmits the message to the UE 122 from the transmitter 600 (not illustrated). The receiver 500 of the UE 122 receives the RRC message from the gNB 108 (step S1200). Note that the RRC message described above may be a message related to reconfiguration of RRC connection or another message. The above-described message related to reconfiguration of RRC connection may be a message named the RRC reconfiguration message described in NPL 10. Note that the UE 122 may receive the above-described message related to reconfiguration of RRC connection from the eNB 102, and the message related to reconfiguration of RRC connection in this case may be a message named the RRC connection re-establishment message described in NPL 4.

Next, the processing unit 502 of the UE 122 checks whether the RRC message described above includes information related to the context to be released. In a case that the RRC message includes information related to the context to be released, then based on the inclusion of the information related to the context to be released, the context is released (step S1202). Note that the context described above may be associated with the context identifier for identifying the context. The context identifier and the context described above may be associated with each other on a one-to-one basis. The above-described information related to the context to be released may be the context identifier associated with the corresponding context. The above-described information related to the context to be released may be a list of context identifiers to allow multiple contexts to be released.

Note that the context described above may be the total Ethernet header information in the Ethernet frame. The context identifier described above may be an identifier used for the Ethernet header compression. The context described above may be a RoHC context, and the context identifier described above may be a context identifier in RoHC.

The above-described information related to the context to be released may be divided into information related to a context to be released for uplink transmission and information related to a context to be released for downlink reception.

The above-described information related to the context to be released may be included in the PDCP configuration information element illustrated in FIG. 7 and/or FIG. 8. In step S1202, in a case that, based on the inclusion of the information related to the context to be released, the context is released, the following procedure may be used for the release.

(A) In a case that the value of the radio bearer identity information element (or the radio bearer identity field) included in the RRC message received is present as the current configuration for the UE 122, and based on the inclusion, in the RRC message received, of the information related to the context to be released, the RRC layer of the UE 122 notifies the above-described information related to the context to be released to the lower layer or the PDCP entity.

(B) In the PDCP entity, based on the upper layer or the RRC layer requesting the release of the context, the context is released.

Note that, instead of the processing in (A) described above, in a case that the value of the radio bearer identity information element (or the radio bearer identity field) included in the RRC message received is present as the current configuration for the UE 122, and based on the inclusion of the PDCP configuration information element in the RRC message received, the RRC layer of the UE 122 may reconfigure the PDCP entity in accordance with the PDCP configuration information element described above. Instead of the processing in (B) described above, in the PDCP entity, based on the reception, from the upper layer or the RRC layer, of the context identifier of the context to be released, the context may be released. The processing in B described above may be performed in the Ethernet header compression protocol of the PDCP entity.

Note that the PDCP entity of the UE 122 may receive, from the SDAP entity, the above-described information related to the context to be released.

Note that in step S1202, the release may be deletion. The term "release" in step S1102 may be replaced with deletion or equivalent term.

FIG. 13 illustrates an example of an ASN.1 notation of information related to a context to be released or deleted which information is included in an RRC message received from the gNB 108 by the UE 122 in step S1200 described above. Note that as in FIGS. 7, 8, 9, and 10, in the examples of ASN.1, <omitted> and <partly omitted> are not part of the ASN.1 notation but indicate that other information is omitted. Note that there may also be omitted information elements in a part where neither <omitted> nor <partly omitted> is indicated. Note that the examples of ASN.1 do not correctly follow the ASN.1 notation but represent examples of parameters in the RRC message according to an embodiment of the present invention and that any other designation and any other notation may be used. The examples of ASN.1 correspond to only examples related to main information closely associated with an aspect of the present invention in order to avoid complicated description. Note that the parameters notated in ASN.1 may all be referred to as information elements without distinction between fields, information elements, or the like. In an embodiment of the present invention, the parameters such as fields and information elements notated in ASN.1, the parameters being included in the RRC message, may also be referred to as information.

FIG. 13 illustrates an example in which the PDCP configuration information element in FIG. 7 and/or FIG. 8 includes an information element or a field related to the context to be released or deleted. In FIG. 13, the field or information element included in the PDCP configuration information element and indicated by the designation ehc-contextToReleaseList-r16 may be an information element or field indicating a list of the context identifiers of contexts to be released or deleted. In the example of FIG. 13, the information element or field indicated by the designation EHC-CID may be an information element or field indicating a context identifier. The information element or field indicated by the designation ehc-maxCID in FIG. 13 may be the same as the information element or field indicated by the designation ehc-maxCID in FIG. 9. The information element or field indicating a context identifier may be an integer value from 1 to ehc-maxCID.

Note that some or all of the fields and information elements in FIG. 13 may be separately configured for transmission (uplink) and/or for reception (downlink). Different information elements or fields may be used for uplink configuration and for downlink configuration.

A second example of the processing method of the UE 122 according to an embodiment of the present invention will be described by using FIG. 14. In general, in the processing method of the UE 122 according to an embodiment of the present invention, illustrated in FIG. 14, each time the UE 122 receives a PDCP SDU with the same context information (part or all of the Ethernet header information) from the upper layer, the UE 122 may start or restart a context deletion timer, and delete the corresponding context in response to expiry of the timer. Each time the UE 122 receives the PDCP PDU with the same context identifier from the lower layer, the UE 122 may start or restart the context deletion timer, and delete the context in response to expiry of the timer. The value of the context deletion timer may be included in the RRC message received from the gNB 108. Note that the processing of the UE 122 according to an embodiment of the present invention illustrated in FIG. 14 may be performed in a case that the Ethernet header compression is configured.

Figure 14:
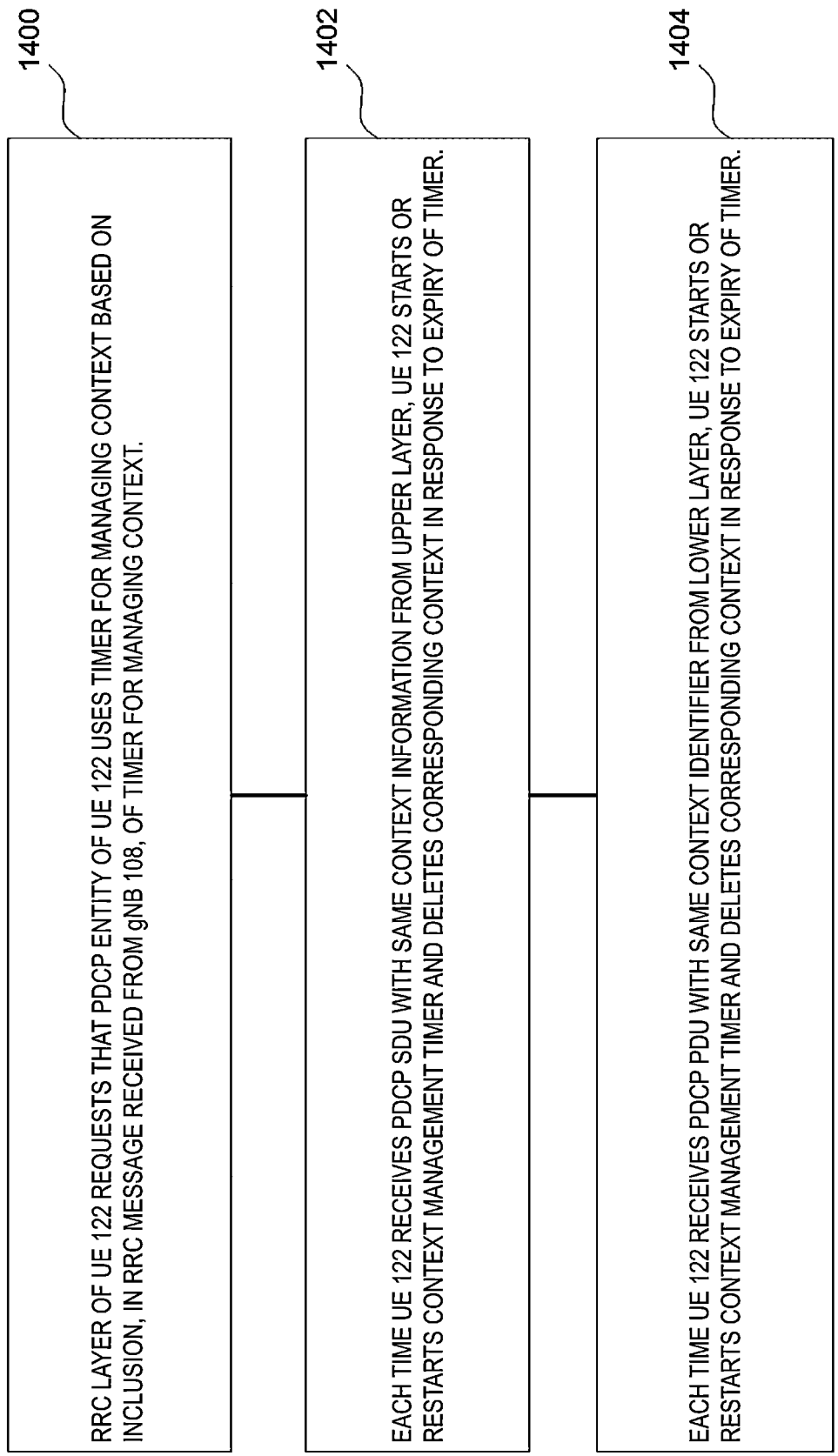
FIG. 14 illustrates a second example of a processing method of the UE 122 according to an embodiment of the present invention.

In FIG. 14, the processing unit 602 of the gNB 108 creates an RRC message for causing the UE 122 to perform processing and transmits the message to the UE 122 from the transmitter 600 (not illustrated). The RRC layer of the UE 122 checks whether the RRC message received from the gNB 108 includes an information element or a field related to a timer for managing context. The above-described timer for managing context may be interpreted as a timer used to release or delete the context. In a case that the RRC message includes an information element or a field related to a timer for managing context, the RRC layer of the UE 122 may request that the PDCP entity of the UE 122 use the timer for managing context (step S1400).

Note that in step S1400, in a case that the RRC message received from the gNB 108 includes an information element or a field related to the timer for managing context, the RRC layer of the UE 122 may configure, for the PDCP entity of the UE 122, the timer for managing context.

The PDCP entity of the UE 122 checks the Ethernet header of the PDCP SDU received from the upper layer to check whether the Ethernet header information to be compressed is stored as a context. In a case that the Ethernet header information to be compressed, the information included in the Ethernet header of the PDCP SDU described above, is not stored as a context, the Ethernet header information to be compressed may be associated with the context identifier and stored as a context, and the timer for managing context may be configured for the stored context described above or the context identifier described above and started or restarted. Instead of configuring, for the stored context, the above-described timer for managing context and starting or restarting the timer, the timer for managing context may be configured for the context identifier with which the stored context is associated, and the timer may be started or restarted. Note that the above-described timer for managing context may be configured by the RRC layer or the upper layer. The above-described timer for managing context need not necessarily be configured. In a case that the Ethernet header information to be compressed, the information included in the Ethernet header of the PDCP SDU described above, is stored as a context, the PDCP entity of the UE 122 may start or restart the timer for managing context, the timer being configured for the stored context described above and/or the context identifier with which the context described above is associated, or the timer in operation. In response to expiry of the timer for managing context, the timer being configured for the context described above or the context identifier with which the context described above is associated, or the timer in operation, the PDCP entity of UE 122 may release or delete the context described above and/or the context identifier with which any context described above is associated (step S1402).

The PDCP entity of the UE 122 checks whether the PDCP PDU received from the lower layer explicitly or implicitly includes information indicating that the Ethernet header has not been compressed or changed. In a case that the PDCP PDU described above explicitly or implicitly includes information indicating that the Ethernet header has not been compressed or changed, the Ethernet header information to be compressed which information is included in the Ethernet header included in the PDCP PDU described above may be used as a context and stored in association with the context identifier included in the PDCP PDU described above, and the timer for managing context may be configured for the stored context described above or the context identifier described above and started or restarted. Instead of configuring, for the stored context, the above-described timer for managing context and starting or restarting the timer, the timer for managing context may be configured for the context identifier with which the stored context is associated, and the timer may be started or restarted. Note that the above-described timer for managing context may be configured by the RRC layer or the upper layer. The above-described timer for managing context need not necessarily be configured. In a case that the PDCP PDU described above explicitly or implicitly includes information indicating that the Ethernet header has been compressed or changed, the PDCP entity of the UE 122 may start or restart the timer for managing context, the timer being configured for the context identifier included in the PDCP PDU described above or the context associated with the context identifier described above, or the timer in operation. In response to expiry of the timer for managing context, the timer being configured for the context described above or the context identifier with which the context described above is associated, or the timer in operation, the PDCP entity of the UE 122 may release or delete the context described above and/or the context identifier with which any context described above is associated (step S1404).

Note that, in step S1404, instead of checking whether the PDCP PDU received from the lower layer explicitly or implicitly includes information indicating that the Ethernet header has not been compressed or changed, the PDCP entity of the UE 122 may check whether the context associated with the context identifier included in the PDCP PDU received from the lower layer is stored. In a case that the context is not stored that is associated with the context identifier included in the PDCP PDU described above, the Ethernet header information to be compressed which information is included in the Ethernet header included in the PDCP PDU described above may be used as a context and stored in association with the context identifier included in the PDCP PDU described above, and the timer for managing context may be configured for the stored context described above or the context identifier described above and started or restarted. In a case that the context is stored that is associated with the context identifier included in the PDCP PDU described above, the timer for managing context may be started or restarted which timer is configured for the stored context described above and/or the context identifier with which the context described above is associated or which timer is in operation.

Note that, in step S1402 and/or step S1404, the timer for managing context may be managed independently for each context and/or for each context identifier. Specifically, a first timer for managing context may be separately and independently configured for a first context and/or a first context identifier, and a second timer for managing context may be separately and independently configured for a second context and/or a second context identifier, and the first timer for managing context and the second timer for managing context may be separately and independently started or restarted. In response to expiry of the above-described first timer for managing context, the first context and/or first context identifier described above may be released or deleted, and in response to expiry of the above-described second timer for managing context, the second context and/or second context identifier described above may be released or deleted.

Note that in step S1402 and/or step S1404, in a case that the gNB 108 configures a new timer value for the timer for managing context, all of the timers may be restarted or the new timer value may be configured for a timer configured in response to new storage of a context, with no operation performed on the timer in operation.

Note that, in an embodiment of the present invention, starting a timer may refer to activating the timer.

Note that the processing in step S1402 and/or step 1404 may be performed based on the fact that the PDCP entity of the UE 122 is requested to use the timer for managing context by the RRC layer or the upper layer. The processing in step S1402 and/or step 1404 may be performed based on the fact that the timer for managing context is configured for the PDCP entity of the UE 122 by the RRC layer or the upper layer.

Note that steps S1402 and S1404 have no ordinal relationship and may be performed as independent steps.

Note that the processing in steps S1402 and S1404 may be performed in conjunction with the processing in steps S1100 and S1102 described above.

FIG. 15 illustrates an example of an ASN.1 notation in which the PDCP configuration information element in FIG. 7 and/or FIG. 8 includes the information element or field related to the timer for managing context. In FIG. 15, the field or information element indicated by the designation ehcContextDiscardTimer-16 included in the PDCP configuration information element may be an information element or a field related to the timer for managing context. In the example in FIG. 15, the field or information element indicated by the designation ehcContextDiscardTimer-16 may be present exclusively during setup. In the example in FIG. 15, the field or information element indicated by the designation ehcContextDiscardTimer-16 may take any value among s1, s2, s3, s5, s7, s10, s15, s20, s40, s50, s60, s80, s100, s120, s150, and s180. The parameters represented by sN (N is a natural number) described above may each mean N second(s).

Note that some or all of the fields and information elements in FIG. 15 may be separately configured for transmission (uplink) and/or for reception (downlink). Different information elements or fields may be used for uplink configuration and for downlink configuration.

A third example of the processing method of the UE 122 according to an embodiment of the present invention will be described by using FIGS. 9 and 16. In general, in the processing method of the UE 122 according to an embodiment of the present invention illustrated in FIG. 16, in a case that the UE 122 newly stores a context for the PDCP SDU received from the upper layer and that no context identifier is available, that is, the number of contexts stored in the UE 122 has reached the maximum value for the context identifiers configured by the gNB 108, then the UE 122 may assign, to the new context, a context identifier associated with any stored context. In this case, an old context may be overwritten with a new context. In a case that a context associated with a context identifier is already stored, the context being included in the PDCP PDU received from the lower layer by the UE 122, but that the PDCP PDU described above explicitly or implicitly includes information indicating that the Ethernet header has not been compressed or changed, the stored context may be overwritten with Ethernet header information to be compressed, the information being included in the Ethernet header included in the PDCP PDU described above.

Figure 16:
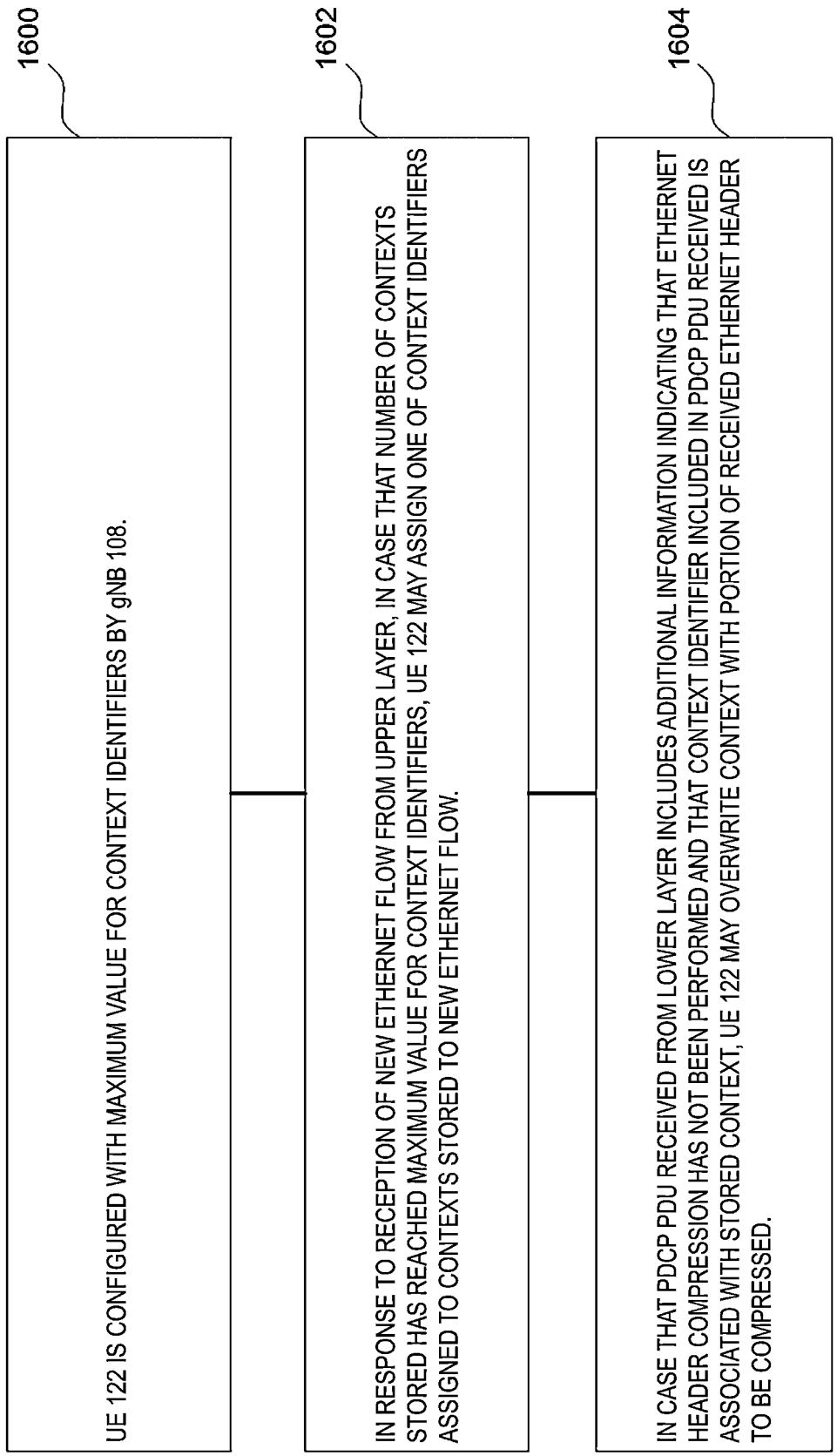
FIG. 16 illustrates a third example of a processing method of the UE 122 according to an embodiment of the present invention.

In FIG. 16, the processing unit 602 of the gNB 108 creates an RRC message for causing the UE 122 to perform processing and transmits the RRC message to the UE 122 from the transmitter 600 (not illustrated). The UE 122 is configured with the maximum value for the context identifiers by the information element or field indicating the maximum value for the context identifiers included in the RRC message received from the gNB 108. Note that the context identifier described above may be a field or an information element indicated by the designation ehc-maxCID illustrated in FIG. 9. The maximum value for the context identifiers may be configured by using different fields or information elements for the maximum value for uplink context identifiers and for the maximum value for downlink context identifiers (step S1600).

The PDCP entity of the UE 122 checks the Ethernet header of the PDCP SDU received from the upper layer to check whether the Ethernet header information to be compressed is stored as a context. In a case that the Ethernet header information to be compressed, the information being included in the Ethernet header of the PDCP SDU described above, is not stored as a context and that the number of contexts currently stored has reached the maximum value for the context identifiers configured, then the PDCP entity of the UE 122 may associate, with a new Ethernet flow, one of the context identifiers associated with the contexts currently stored, i.e., associate the context identifier with the Ethernet header information to be compressed, the information being included in the Ethernet header of the PDCP SDU described above, and may store the information as a new context. In this case, the above-described context associated with the context identifier may be overwritten with a new context. In a case that the Ethernet header information to be compressed, the information being included in the Ethernet header of the PDCP SDU described above, is not stored as a context and that the number of contexts currently stored has reached the maximum value for the context identifiers configured, then the PDCP entity of the UE 122 may avoid storing the Ethernet header information to be compressed as a context, the information being included in the Ethernet header, and send the information without applying the Ethernet header compression (step S1602). Note that the Ethernet flow described above may refer to an Ethernet frame in which part or all of the Ethernet header information is the same.

The PDCP entity of the UE 122 checks whether the PDCP PDU received from the lower layer explicitly or implicitly includes information indicating that the Ethernet header has not been compressed or changed. In a case that the PDCP PDU described above explicitly or implicitly includes information indicating that the Ethernet header has not been compressed or changed and that the value of the context identifier included in the PDCP PDU described above is already associated with the stored context, then the PDCP entity of the UE 122 may overwrite the context associated with the context identifier described above with the Ethernet header information to be compressed, the information being included in the Ethernet header included in the above-described PDCP PDU received from the lower layer (step S1604).

Note that steps S1602 and S1604 have no ordinal relationship and may be performed as independent steps.

Note that, in steps S1602 and/or S1604 described above, for distinction between the PDCP PDU to which the Ethernet header compression is applied and the PDCP PDU to which the Ethernet header compression is not applied, a context identifier with a particular value may be used for the PDCP PDU to which the Ethernet header compression is not applied. For example, the context identifier being zero may indicate that the Ethernet header compression is not applied. The context identifier indicating that the Ethernet header compression is not applied may be configured by the gNB 108 through the RRC message. Instead of using the particular context identifier indicating that the Ethernet header compression is not applied, information indicating that the Ethernet header compression is not applied may be added to the PDCP PDU. The information indicating that the Ethernet header compression is not applied may be added to the PDCP header or to a payload portion of the PDCP PDU.

Note that, in an embodiment of the present invention, the processing in steps S1102, S1404, and S1604 may be performed exclusively on the PDCP PDU to which the Ethernet header compression is applied.

In an embodiment of the present invention, the processing in steps S1100 and S1402 may be performed exclusively on the PDCP SDU to which the Ethernet header compression is applied.

Note that part or all of the processing in the example of the processing method of the Ethernet header compression protocol, the first example of the processing method of the UE 122, the second example of the processing method of the UE 122, and the third example of the processing method of the UE 122 according to an embodiment of the present invention may be performed cooperatively.

Note that the Ethernet header information to be compressed according to an embodiment of the present invention may be the total Ethernet header information or part of Ethernet header information.

Note that, in an embodiment of the present invention, the Ethernet header information to be compressed being stored as a context may refer to the Ethernet header information to be compressed being associated with a context identifier. In an embodiment of the present invention, the context identifier may be part of the context.

In an embodiment of the present invention, storage of a context may be interpreted as generation of the context, establishment of the context, or any other term.

In an embodiment of the present invention, the implicit inclusion of information indicating that the Ethernet header has been compressed or changed may refer to non-inclusion of information indicating that the Ethernet header has not been compressed or changed. The implicit inclusion of information indicating that the Ethernet header has not been compressed or changed may refer to non-inclusion of information indicating that the Ethernet header has been compressed or changed.

In the Ethernet header compression processing according to an embodiment of the present invention, the processing on the transmission side may be performed by a compressor for the Ethernet header compression protocol, and the processing on the reception side may be performed by a decompressor for the Ethernet header compression protocol.

In an embodiment of the present invention, the Ethernet header compression has been described, but part or all of the processing in an embodiment of the present invention may be applied to another header compression technology, e.g., RoHC.

In the above description, expressions such as "linked," "mapped", "associated," and the like may be replaced with one another.

Note that in the above description, "A may be interpreted as B" or "A may be B" may include the meaning that B is interpreted as A or that B is assumed as A, in addition to the meaning that A is interpreted as B or that A is assumed as B. In a case that the above description contains "C may be D" and "C may be E," this means inclusion of "D may be E." In a case that the above description contains "F may be G" and "G may be H," this means inclusion of "F may be H."

Various aspects in an embodiment of the present invention will be described below.

An aspect of the present invention provides a terminal apparatus for communicating with a base station apparatus, the terminal apparatus including a receiver configured to receive an RRC message from the base station apparatus, and a processing unit configured to delete a context identifier of a context to be released and the context associated with the context identifier based on inclusion of the context identifier in the RRC message. Note that the context identifier is used for the Ethernet header compression, and the context is part or all of the Ethernet header information.

An aspect of the present invention provides a terminal apparatus for communicating with a base station apparatus, the terminal apparatus including a receiver configured to receive an RRC message from the base station apparatus, and a processing unit configured to, based on inclusion, in the RRC message, of information for configuring a context management timer, in response to reception of a first service data unit from an upper layer, create a first context related to a header included in the first service data unit and start or restart a first timer for the first context in a case that the first context related to the header included in the first service data unit is not stored, and start or restart the first timer and delete the first context based on expiry of the first timer in a case that the first context related to the header included in the first service data unit is stored.

An aspect of the present invention provides a terminal apparatus for communicating with a base station apparatus, the terminal apparatus including a receiver configured to receive an RRC message from the base station apparatus; and a processing unit configured to, based on inclusion, in the RRC message, of information for configuring a context management timer, in response to reception of a second protocol data unit from a lower layer, create a second context related to a header included in the second protocol data unit and start or restart a second timer for the second context in a case that the second protocol data unit includes information indicating that header compression has not been performed, and start or restart the second timer and delete the second context based on expiry of the second timer in a case that the second protocol data unit includes information indicating that header compression has been performed.

An aspect of the present invention provides a terminal apparatus for communicating with a base station apparatus, the terminal apparatus including a processing unit configured to receive, from the base station apparatus, an RRC message including a maximum value of a context identifier, and in response to receiving a third service data unit from an upper layer, assign a fourth context identifier associated with one of stored contexts to a third context related to a header included in the third service data unit in a case that the third context is not stored and that the number of the stored contexts has reached the maximum value for the context identifiers.

An aspect of the present invention provides a base station apparatus for communicating with a terminal apparatus, the base station apparatus including a transmitter configured to transmit an RRC message to the terminal apparatus, and a processing unit configured to cause the terminal apparatus to delete a context identifier of a context to be released and the context associated with the context identifier, based on inclusion of the context identifier in the RRC message. Note that the context identifier is used for the Ethernet header compression, and the context is part or all of the Ethernet header information.

An aspect of the present invention provides a base station apparatus for communicating with a terminal apparatus, the base station apparatus including a transmitter configured to transmit an RRC message to the terminal apparatus, and a processing unit configured to cause the terminal apparatus to, based on inclusion, in the RRC message, of information for configuring a context management timer, in response to reception of a first service data unit from an upper layer, create a first context related to a header included in the first service data unit and start or restart a first timer for the first context in a case that the first context related to the header included in the first service data unit is not stored, and start or restart the first timer and delete the first context based on expiry of the first timer in a case that the first context related to the header included in the first service data unit is stored.

An aspect of the present invention provides a base station apparatus for communicating with a terminal apparatus, the base station apparatus including a transmitter configured to transmit an RRC message to the terminal apparatus, and a processing unit configured to cause the terminal apparatus to, based on inclusion, in the RRC message, of information for configuring a context management timer, in response to reception of a second protocol data unit from a lower layer, create a second context related to a header included in the second protocol data unit and start or restart a second timer for the second context in a case that the second protocol data unit includes information indicating that header compression has not been performed, and start or restart the second timer and delete the second context based on expiry of the second timer in a case that the second protocol data unit includes information indicating that header compression has been performed.

An aspect of the present invention provides a base station apparatus for communicating with a terminal apparatus, the base station apparatus including a processing unit configured to transmit an RRC message including a maximum value of a context identifier to the terminal apparatus, and to cause the terminal apparatus to, in response to receiving a third service data unit from an upper layer, assign a fourth context identifier associated with one of stored contexts to a third context related to a header included in the third service data unit in a case that the third context is not stored and that the number of the stored contexts has reached the maximum value for the context identifiers.

An aspect of the present invention provides a method for a terminal apparatus for communicating with a base station apparatus, the method including receiving an RRC message from the base station apparatus, and deleting a context identifier of a context to be released and the context associated with the context identifier based on inclusion of the context identifier in the RRC message. Note that the context identifier is used for the Ethernet header compression, and the context is part or all of the Ethernet header information.

An aspect of the present invention provides a method for a terminal apparatus for communicating with a base station apparatus, the method including receiving an RRC message from the base station apparatus, and based on inclusion, in the RRC message, of information for configuring a context management timer, in response to reception of a first service data unit from an upper layer, creating a first context related to a header included in the first service data unit and starting or restarting a first timer for the first context in a case that the first context related to the header included in the first service data unit is not stored, and starting or restarting the first timer and deleting the first context based on expiry of the first timer in a case that the first context related to the header included in the first service data unit is stored.

An aspect of the present invention provides a method for a terminal apparatus for communicating with a base station apparatus, the method including receiving an RRC message from the base station apparatus, and based on inclusion, in the RRC message, of information for configuring a context management timer, in response to reception of a second protocol data unit from a lower layer, creating a second context related to a header included in the second protocol data unit and starting or restarting a second timer for the second context in a case that the second protocol data unit includes information indicating that header compression has not been performed, and starting or restarting the second timer and deleting the second context based on expiry of the second timer in a case that the second protocol data unit includes information indicating that header compression has been performed.

An aspect of the present invention provides a method for a terminal apparatus for communicating with a base station apparatus, the method including receiving, from the base station apparatus, an RRC message including a maximum value of a context identifier, and in response to receiving a third service data unit from an upper layer, assigning a fourth context identifier associated with one of stored contexts to a third context related to a header included in the third service data unit in a case that the third context is not stored and that the number of the stored contexts has reached the maximum value for the context identifiers.

An aspect of the present invention provides a method for a base station apparatus for communicating with a terminal apparatus, the method including transmitting an RRC message to the terminal apparatus, and causing the terminal apparatus to delete a context identifier of a context to be released and the context associated with the context identifier, based on inclusion of the context identifier in the RRC message. Note that the context identifier is used for the Ethernet header compression, and the context is part or all of the Ethernet header information.

An aspect of the present invention provides a method for a base station apparatus for communicating with a terminal apparatus, the method including transmitting an RRC message to the terminal apparatus, and causing the terminal apparatus to, based on inclusion, in the RRC message, of information for configuring a context management timer, in response to reception of a first service data unit from an upper layer, create a first context related to a header included in the first service data unit and start or restart a first timer for the first context in a case that the first context related to the header included in the first service data unit is not stored, and start or restart the first timer and delete the first context based on expiry of the first timer in a case that the first context related to the header included in the first service data unit is stored.

An aspect of the present invention provides a method for a base station apparatus for communicating with a terminal apparatus, the method including transmitting an RRC message to the terminal apparatus, and causing the terminal apparatus to, based on inclusion, in the RRC message, of information for configuring a context management timer, in response to reception of a second protocol data unit from a lower layer, create a second context related to a header included in the second protocol data unit and start or restart a second timer for the second context in a case that the second protocol data unit includes information indicating that header compression has not been performed, and start or restart the second timer and delete the second context based on expiry of the second timer in a case that the second protocol data unit includes information indicating that header compression has been performed.

An aspect of the present invention provides a method for a base station apparatus for communicating with a terminal apparatus, the method including transmitting an RRC message including a maximum value of a context identifier to the terminal apparatus, and causing the terminal apparatus to, in response to receiving a third service data unit from an upper layer, assign a fourth context identifier associated with one of stored contexts to a third context related to a header included in the third service data unit in a case that the third context is not stored and that the number of the stored contexts has reached the maximum value for the context identifiers.

A program running on an apparatus according to an aspect of the present invention may serve as a program that controls a Central Processing Unit (CPU) and the like to cause a computer to operate in such a manner as to implement the functions of the above-described embodiments according to the aspect of the present invention. Programs or the information handled by the programs are temporarily loaded into a volatile memory such as a Random Access Memory (RAM) while being processed, or stored in a non-volatile memory such as a flash memory, or a Hard Disk Drive (HDD), and then read, modified, and written by the CPU, as necessary.

Note that the apparatuses in the above-described embodiments may be partially enabled by a computer. In such a case, a program for realizing such control functions may be recorded on a computer-readable recording medium to cause a computer system to read the program recorded on the recording medium to perform the program. It is assumed that the "computer system" mentioned here refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the above-described program may be configured to realize some of the functions described above, and additionally may be configured to realize the functions described above, in combination with a program already recorded in the computer system.

Furthermore, each functional block or various characteristics of the apparatuses used in the above-described embodiments may be implemented or performed with an electric circuit, that is, typically an integrated circuit or multiple integrated circuits. An electric circuit designed to perform the functions described in the present specification may include a general purpose processor, a digital signal processor (DSP), an application specific integrated circuit (ASIC), a field programmable gate array (FPGA), or other programmable logic devices, discrete gates or transistor logic, discrete hardware components, or a combination thereof. The general-purpose processor may be a microprocessor, or the processor may be a processor of known type, a controller, a micro-controller, or a state machine instead. The general-purpose processor or the above-mentioned circuits may include a digital circuit, or may include an analog circuit. Furthermore, in a case that with advances in semiconductor technology, a circuit integration technology appears that replaces the present integrated circuits, it is also possible to use an integrated circuit based on the technology.

Note that the invention of the present application is not limited to the above-described embodiments. Although apparatuses have been described as an example in the embodiment, the invention of the present application is not limited to these apparatuses, and is applicable to a stationary type or a non-movable type electronic apparatus installed indoors or outdoors such as a terminal apparatus or a communication apparatus, for example, an AV device, a kitchen device, a cleaning or washing machine, an air-conditioning device, office equipment, a vending machine, and other household appliances.

Although, the embodiments of the present invention have been described in detail above referring to the drawings, the specific configuration is not limited to the embodiments and includes, for example, design changes within the scope not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. In addition, a configuration in which components, which are described in the embodiment described above, having similar effects are interchanged is also included in the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST

100 E-UTRA
102 eNB
104 EPC
106 NR
108 gNB
110 5GC
112, 114, 116, 118, 120, 124 Interface
122 UE
200, 300 PHY
202, 302 MAC
204, 304 RLC
206, 306 PDCP
208, 308 RRC
310 SDAP
210, 312 NAS
500, 604 Receiver
502, 602 Processing unit
504, 600 Transmitter

The invention claimed is:

1. A terminal apparatus for communicating with a base station apparatus, the terminal apparatus comprising:
   processing circuitry configured to add an Ethernet Header Compression (EHC) context identifier to data in processing of an EHC protocol; and
   a transmitter configured to transmit, to the base station apparatus, the data to which the EHC context identifier is added, wherein
   in a case that the EHC context identifier is a particular value, the EHC context identifier indicates that Ethernet header compression is not applied to an Ethernet header of the data,
   the EHC configuration includes a maximum value of EHC context identifiers, and
   the processing circuitry is configured to,
   in a case that the number of EHC contexts stored reaches the maximum value of the EHC context identifiers and that a context corresponding to the Ethernet header of the data does not exist in the stored EHC contexts,
   make the EHC context identifier to be added to the data the particular value.

2. The terminal apparatus according to claim 1, further comprising:
   a receiver configured to receive, from the base station apparatus, a Radio Resource Control (RRC) message including an EHC configuration,
   wherein the processing circuitry is configured to configure the EHC protocol in accordance with the EHC configuration.

3. A base station apparatus for communicating with a terminal apparatus, the base station apparatus comprising:
   a receiver configured to receive, from the terminal apparatus, data to which an Ethernet Header Compression (EHC) context identifier is added in processing of an EHC protocol; and
   processing circuitry configured to, in a case that the EHC context identifier is a particular value, determine that Ethernet header compression is not applied to an Ethernet header of the data,
   the EHC configuration includes a maximum value of EHC context identifiers, and
   the terminal apparatus makes the EHC context identifier added to the data the particular value, in a case that the number of EHC contexts stored reaches the maximum value of the EHC context identifiers and that a context corresponding to the Ethernet header of the data does not exist in the stored EHC contexts.

4. The base station apparatus according to claim 3, further comprising:
   a transmitter configured to transmit, to the terminal apparatus, a Radio Resource Control (RRC) message including an EHC configuration,
   wherein the EHC configuration is used for configuring the EHC protocol of the terminal apparatus.

5. A method for a base station apparatus for communicating with a terminal apparatus, the method comprising:
   receiving, from the terminal apparatus, data to which an Ethernet Header Compression (EHC) context identifier is added in processing of an EHC protocol; and
   determining that Ethernet header compression is not applied to an Ethernet header of the data, in a case that the EHC context identifier is a particular value,
   the EHC configuration includes a maximum value of EHC context identifiers, and
   the terminal apparatus makes the EHC context identifier added to the data the particular value, in a case that the number of EHC contexts stored reaches the maximum value of the EHC context identifiers and that a context corresponding to the Ethernet header of the data does not exist in the stored EHC contexts.

* * * * *